United States Patent
Rico Alvarino et al.

(10) Patent No.: US 10,334,617 B2
(45) Date of Patent: Jun. 25, 2019

(54) SYSTEM INFORMATION FOR ENHANCED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Hao Xu, San Diego, CA (US)

(73) Assignee: Qualcomm Incorporated, San Diego ( * ) Notice: Subject to any disclaimer, the term of this patent is extended or adjusted under 35 U.S.C. 154(b) by 137 days.

(21) Appl. No.: 15/178,253

(22) Filed: Jun. 9, 2016

(65) Prior Publication Data

US 2016/0374109 A1    Dec. 22, 2016

Related U.S. Application Data

(60) Provisional application No. 62/180,463, filed on Jun. 16, 2015.

(51) Int. Cl.
*H04L 5/00* (2006.01)
*H04W 4/70* (2018.01)
(Continued)

(52) U.S. Cl.
CPC ........ *H04W 72/1263* (2013.01); *H04B 1/713* (2013.01); *H04H 20/16* (2013.01);
(Continued)

(58) Field of Classification Search
CPC ... H04W 48/10; H04W 72/1263; H04H 20/16
See application file for complete search history.

(56) References Cited

U.S. PATENT DOCUMENTS

| 2009/0067352 A1 | 3/2009 | Wang |
| 2011/0007673 A1 | 1/2011 | Ahn et al. |

(Continued)

FOREIGN PATENT DOCUMENTS

| EP | 2947791 A1 | 11/2015 |
| WO | WO-2009116751 A2 | 9/2009 |

(Continued)

OTHER PUBLICATIONS

ISA/EP, International Search Report and Written Opinion of the International Searching Authority, Int'l Application No. PCT/US2016/037212, dated Sep. 9, 2016, 14 pgs, European Patent Office, Rijswijk, NL.

(Continued)

*Primary Examiner* — Charles C Jiang
*Assistant Examiner* — Ryan C Kavleski
(74) *Attorney, Agent, or Firm* — Holland & Hart LLP/Qualcomm

(57) ABSTRACT

Methods, systems, and devices for wireless communication are described. A wireless device (such as a machine type communications (MTC) device) may determine one or more scheduling parameters for a system information block (SIB) based on the bandwidth or duplexing configuration of a communication link. The scheduling parameters may include a repetition level, a transport block size, a subframe index, or the like; and the scheduling parameters may depend on signaling in a broadcast communication (e.g., a master information block (MIB)) or a frequency hopping configuration, or both. In some cases, a broadcast channel may be scheduled during a transmission time interval (TTI) within a narrowband region of a system bandwidth. Available resources within the TTI may be identified and the SIB may be mapped to the available resources within the nar- (Continued)

rowband region based on the location of the broadcast information.

61 Claims, 21 Drawing Sheets

(51) Int. Cl.
*H04W 72/12* (2009.01)
*H04H 20/16* (2008.01)
*H04B 1/713* (2011.01)
*H04W 48/10* (2009.01)
*H04W 88/02* (2009.01)

(52) U.S. Cl.
CPC ............... *H04L 5/005* (2013.01); *H04W 4/70* (2018.02); *H04W 48/10* (2013.01); *H04W 72/1289* (2013.01); *H04W 88/02* (2013.01)

(56) References Cited

U.S. PATENT DOCUMENTS

| | | | |
|---|---|---|---|
| 2011/0039499 A1 | 2/2011 | Zhang et al. | |
| 2011/0069672 A1 | 3/2011 | Lee et al. | |
| 2012/0230273 A1 | 9/2012 | He et al. | |
| 2012/0327895 A1 | 12/2012 | Wallen et al. | |
| 2013/0044651 A1* | 2/2013 | Wang | H04W 72/0406 370/280 |
| 2013/0083753 A1* | 4/2013 | Lee | H04W 74/0833 370/329 |
| 2013/0301524 A1 | 11/2013 | Xu et al. | |
| 2014/0140271 A1 | 5/2014 | Devarasetty et al. | |
| 2014/0302867 A1 | 10/2014 | Mizusawa | |
| 2014/0362752 A1 | 12/2014 | Jha et al. | |
| 2014/0369243 A1 | 12/2014 | Guo et al. | |
| 2015/0079938 A1* | 3/2015 | Jung | H04W 48/06 455/411 |
| 2015/0085717 A1 | 3/2015 | Papasakellariou et al. | |
| 2015/0327155 A1* | 11/2015 | Lee | H04W 48/12 370/329 |
| 2016/0227345 A1* | 8/2016 | Xu | H04W 4/06 |
| 2016/0315752 A1* | 10/2016 | Chen | H04L 5/005 |
| 2016/0344515 A1 | 11/2016 | Aiba et al. | |
| 2017/0373902 A1* | 12/2017 | Zhang | H04L 27/2617 |

FOREIGN PATENT DOCUMENTS

| | | |
|---|---|---|
| WO | WO-2013131262 A1 | 9/2013 |
| WO | WO-2014112850 A1 | 7/2014 |
| WO | WO-2015066645 A1 | 5/2015 |

OTHER PUBLICATIONS

NEC Group: "Maximum Bandwidth Reduction for Low-Cost MTC UE based on LTE", 3GPP Draft; R1-120259, 3rd Generation Partnership Project (3GPP), Jan. 31, 2012, 6 Pages, Feb. 6, 2012-Feb. 10, 2012, XP050562813, title section 2.2 Bandwidth sharing Mobile Competence Centre, 650, Route Des Lucioles, F-06921 Sophia-Antipolis Cedex, France, vol. RAN WG1, No. Dresden, Germany.

Jian W., et al., "A Fast Method for Downlink Cell Search in TDSCOMA", 11th IEEE Singapore International Conference on Communication Systems, ICCS 2008, IEEE, Piscataway, NJ, USA, Nov. 19, 2008 (Nov. 19, 2008), pp. 1569-1573, XP031400301, ISBN: 978-1-4244-2423-8.

NTT Docomo, et al., "Introduction of Additional TDD UL/DL Configuration in Rel-12", 3GPP Draft, RP-131781, 3rd Generation Partnership Project (3GPP), Mobile Competence Centre, 650, Route Des Lucioles, F-06921 Sophia-Antipolis Cedex, France, vol. TSG RAN, No. Susan, Korea, Dec. 3, 2013-Dec. 6, 2013, Dec. 2, 2013 (Dec. 2, 2013), pp. 1-10, XP050733943, Retrieved from the Internet: URL: http://www.3gpp.org/ftp/Meetings_3GPP_SYNC/RAN/RAN/Docs/, [retrieved on Dec. 2, 2013].

* cited by examiner

SYSTEM INFORMATION FOR ENHANCED MACHINE TYPE COMMUNICATION

CROSS REFERENCES

The present Application for Patent claims priority to U.S. Provisional Patent Application No. 62/180,463 by Rico Alvarino, et al., entitled "System Information for Enhanced Machine Type Communication," filed Jun. 16, 2015, assigned to the assignee hereof.

BACKGROUND

The following relates generally to wireless communication, and more specifically to system information for enhanced machine type communication (eMTC).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some wireless systems, system information may be communicated via one or more broadcast messages. In some cases, different system information may be used by different devices to receive or decode these messages. For example, machine type communications (MTC) devices may utilize different system information than other UEs; and the system information for MTC devices may be broadcast with a particular timing, according to a particular schedule, or with certain frequency resources. If a device is unaware of such timing, scheduling, or frequency resources, the device may not be able to connect to a wireless network.

SUMMARY

A wireless device (such as a machine type communications (MTC) device) may determine one or more scheduling parameters for a system information block (SIB) based on the bandwidth or duplexing configuration of a communication link. The scheduling parameters may depend on signaling in a broadcast communication (e.g., a master information block (MIB)) or a frequency hopping configuration, or both. In some cases, a broadcast channel is scheduled during a transmission time interval (TTI) within a narrowband region of a system bandwidth. Available resources within the TTI, which may be fewer than all resources of the narrowband region within the TTI, may be identified, and the SIB may be mapped to the available resources. A determination of available resources for a SIB may be based on the location of broadcast information; for instance, the SIB may be mapped so as to avoid collisions with a broadcast channel.

A method of wireless communication is described. The method may include determining a bandwidth or duplexing configuration for communication with a base station, determining a scheduling parameter for a SIB based on the bandwidth or duplexing configuration, and receiving the SIB according to the scheduling parameter.

An apparatus for wireless communication is described. The apparatus may include means for determining a bandwidth or duplexing configuration for communication with a base station, means for determining a scheduling parameter for a SIB based on the bandwidth or duplexing configuration, and means for receiving the SIB according to the scheduling parameter.

A further apparatus for wireless communication is described. The apparatus may include a processor, memory in electronic communication with the processor, and instructions stored in the memory and operable, when executed by the processor, to cause the apparatus to determine a bandwidth or duplexing configuration for communication with a base station, determine a scheduling parameter for a SIB based on the bandwidth or duplexing configuration, and receive the SIB according to the scheduling parameter.

A non-transitory computer-readable medium storing code for wireless communication is described. The code may include instructions executable to determine a bandwidth or duplexing configuration for communication with a base station, determine a scheduling parameter for a SIB based on the bandwidth or duplexing configuration, and receive the SIB according to the scheduling parameter.

Some examples of the method, apparatuses, or non-transitory computer-readable medium described here may further include processes, features, means, or instructions for receiving signaling indicative of the scheduling parameter for the SIB in a broadcast communication, where determining the scheduling parameter involves interpreting the received signaling based on the determined bandwidth or duplexing configuration. Additionally or alternatively, in some examples the broadcast communication may be a master information block (MIB).

In some examples of the method, apparatuses, or non-transitory computer-readable medium described here, the signaling comprises a bit field indicative of the scheduling parameter for the SIB. Additionally or alternatively, some examples may include processes, features, means, or instructions for determining a frequency hopping configuration for communication with the base station, where the scheduling parameter for the SIB is determined based on the frequency hopping configuration.

In some examples of the method, apparatuses, or non-transitory computer-readable medium described here, the scheduling parameter for the SIB comprises at least one of a repetition level, a transport block size, or a subframe index. Additionally or alternatively, in some examples the scheduling parameter for the SIB comprises a number of assigned resource blocks.

In some examples of the method, apparatuses, or non-transitory computer-readable medium described herein, the SIB involves a machine type communication (MTC) SIB1. Additionally or alternatively, in some examples the bandwidth and duplexing configuration is determined based on a broadcast communication.

In some examples of the method, apparatuses, or non-transitory computer-readable medium described here, the broadcast communication may contain as least one of a MIB, a primary synchronization signal (PSS), or a secondary synchronization signal (SSS).

A further method of wireless communication is described. The method may include determining that a broadcast channel is scheduled during a TTI within a narrowband region of a system bandwidth, identifying resources available for receiving a SIB during the TTI based on the determination, and monitoring for the SIB within the narrowband region based on identifying the available resources.

A further apparatus for wireless communication is described. The apparatus may include means for determining that a broadcast channel is scheduled during a TTI within a narrowband region of a system bandwidth, means for identifying resources available for receiving a SIB during the TTI based on the determination, and means for monitoring for the SIB within the narrowband region based on identifying the available resources.

A further apparatus for wireless communication is described. The apparatus may include a processor, memory in electronic communication with the processor, and instructions stored in the memory and operable, when executed by the processor, to cause the apparatus to determine that a broadcast channel is scheduled during a TTI within a narrowband region of a system bandwidth, identify resources available for receiving a SIB during the TTI based on the determination, and monitor for the SIB within the narrowband region based on identifying the available resources.

A further non-transitory computer-readable medium storing code for wireless communication is described. The code may include instructions executable to determine that a broadcast channel is scheduled during a TTI within a narrowband region of a system bandwidth, identify resources available for receiving a SIB during the TTI based on the determination, and monitor for the SIB within the narrowband region based on identifying the available resources.

In some examples of the method, apparatuses, or non-transitory computer-readable medium described herein, the available resources comprise resource blocks of the TTI that exclude the broadcast channel, and monitoring for the SIB comprises monitoring for the SIB on the resource blocks of the TTI that exclude the broadcast channel, and refraining from monitoring for the SIB during the TTI based on the determination that the broadcast channel is scheduled during the TTI. Additionally or alternatively, in some examples the resources available for the SIB comprise subcarriers of the narrowband region that exclude the broadcast channel, and monitoring for the SIB may include monitoring for the SIB during the TTI on the subcarriers that exclude the broadcast channel.

In some examples of the method, apparatuses, or non-transitory computer-readable medium described herein, the resources available for the SIB comprise available portions of subcarriers within the narrowband region, the subcarriers comprise the broadcast channel and the available portions comprise resource elements that exclude the broadcast channel, and monitoring for the SIB may include monitoring for the SIB during the TTI on the available portions of the subcarriers. Additionally or alternatively, some examples may include processes, features, means, or instructions for identifying a first set of resource elements available for a broadcast channel repetition, wherein monitoring for the SIB may involve monitoring for the SIB during the TTI on a second set of resource elements that excludes resource elements of the first set.

In some examples of the method, apparatuses, or non-transitory computer-readable medium described herein, monitoring for the SIB may include monitoring on resource elements of the TTI that are available for a cell-specific reference signals (CRS) transmission, and wherein the resource elements exclude the CRS transmission. Additionally or alternatively, some examples may include processes, features, means, or instructions for refraining from monitoring resource elements available for CRS transmission.

A further method of wireless communication is described. The method may include determining a bandwidth or duplexing configuration for communication with a UE or group of UEs, determining a scheduling parameter for a SIB based on the bandwidth or duplexing configuration, and transmitting the SIB according to the scheduling parameter.

A further apparatus for wireless communication is described. The apparatus may include means for determining a bandwidth or duplexing configuration for communication with a UE or group of UEs, means for determining a scheduling parameter for a SIB based on the bandwidth or duplexing configuration, and means for transmitting the SIB according to the scheduling parameter.

A further apparatus for wireless communication is described. The apparatus may include a processor, memory in electronic communication with the processor, and instructions stored in the memory and operable, when executed by the processor, to cause the apparatus to determine a bandwidth or duplexing configuration for communication with a UE or group of UEs, determine a scheduling parameter for a SIB based on the bandwidth or duplexing configuration, and transmit the SIB according to the scheduling parameter.

A further non-transitory computer-readable medium storing code for wireless communication is described. The code may include instructions executable to determine a bandwidth or duplexing configuration for communication with a UE or group of UEs, determine a scheduling parameter for a SIB based on the bandwidth or duplexing configuration, and transmit the SIB according to the scheduling parameter.

Some examples of the method, apparatuses, or non-transitory computer-readable medium described here may further include processes, features, means, or instructions for transmitting signaling indicative of the scheduling parameter for the SIB in a broadcast communication, where the scheduling parameter for the SIB is indicated based on the system bandwidth or duplexing configuration. Additionally or alternatively, in some examples the broadcast communication comprises a MIB or synchronization signals PSS or SSS.

In some examples of the method, apparatuses, or non-transitory computer-readable medium described here, the signaling comprises a bit field indicative of the scheduling parameter. Additionally or alternatively, some examples may include processes, features, means, or instructions for determining a frequency hopping configuration, wherein the scheduling parameter is determined based on the frequency hopping configuration.

A further method of wireless communication is described. The method may include determining that a broadcast channel is scheduled during a TTI within a narrowband region of a system bandwidth, identifying resources available for a SIB during the TTI based at least in part on the determination, and mapping the SIB to resources within the narrowband region based on identifying available resources of the TTI.

A further apparatus for wireless communication is described. The apparatus may include means for determining that a broadcast channel is scheduled during a TTI within a narrowband region of a system bandwidth, means for identifying resources available for a SIB during the TTI based on the determination, and means for mapping the SIB to resources within the narrowband region based at least in part on identifying available resources of the TTI.

A further apparatus for wireless communication is described. The apparatus may include a processor, memory in electronic communication with the processor, and instructions stored in the memory and operable, when executed by the processor, to cause the apparatus to determine that a broadcast channel is scheduled during a TTI within a narrowband region of a system bandwidth, identify resources available for a SIB during the TTI based on the determination, and map the SIB to resources within the narrowband region based at least in part on identifying available resources of the TTI.

A further non-transitory computer-readable medium storing code for wireless communication is described. The code may include instructions executable to determine that a broadcast channel is scheduled during a TTI within a narrowband region of a system bandwidth, identify resources available for a SIB during the TTI based on the determination, and map the SIB to resources within the narrowband region based on identifying available resources of the TTI.

Some examples of the method, apparatuses, or non-transitory computer-readable medium described here may further include processes, features, means, or instructions for refraining from mapping the SIB to resources within the TTI. Additionally or alternatively, in some examples the resources available for the SIB comprise subcarriers that exclude the broadcast channel, and mapping the SIB comprises mapping the SIB within the TTI onto subcarriers that exclude the broadcast channel.

In some examples of the method, apparatuses, or non-transitory computer-readable medium described here, the resources available for the SIB comprise available portions of subcarriers within the narrowband region, wherein the subcarriers may include the broadcast channel and the available portions comprise resource elements that exclude the broadcast channel, and mapping the SIB may involve mapping the SIB within the TTI onto the available portions of the subcarriers. Additionally or alternatively, some examples may include processes, features, means, or instructions for identifying a first set of resource elements of the TTI available for a broadcast channel repetition, and mapping the SIB may involve mapping the SIB onto a second set of resource elements of the TTI that excludes resource elements of the first set.

In some examples of the method, apparatuses, or non-transitory computer-readable medium described here, mapping the SIB may include mapping the SIB onto resource elements available for a CRS transmission. Additionally or alternatively, in some examples mapping the SIB may include mapping the SIB onto resource elements excluding those available for a cell-specific reference signals (CRS) transmission.

BRIEF DESCRIPTION OF THE DRAWINGS

Aspects of the disclosure are described in reference to the following figures.

DETAILED DESCRIPTION

Figure 1:
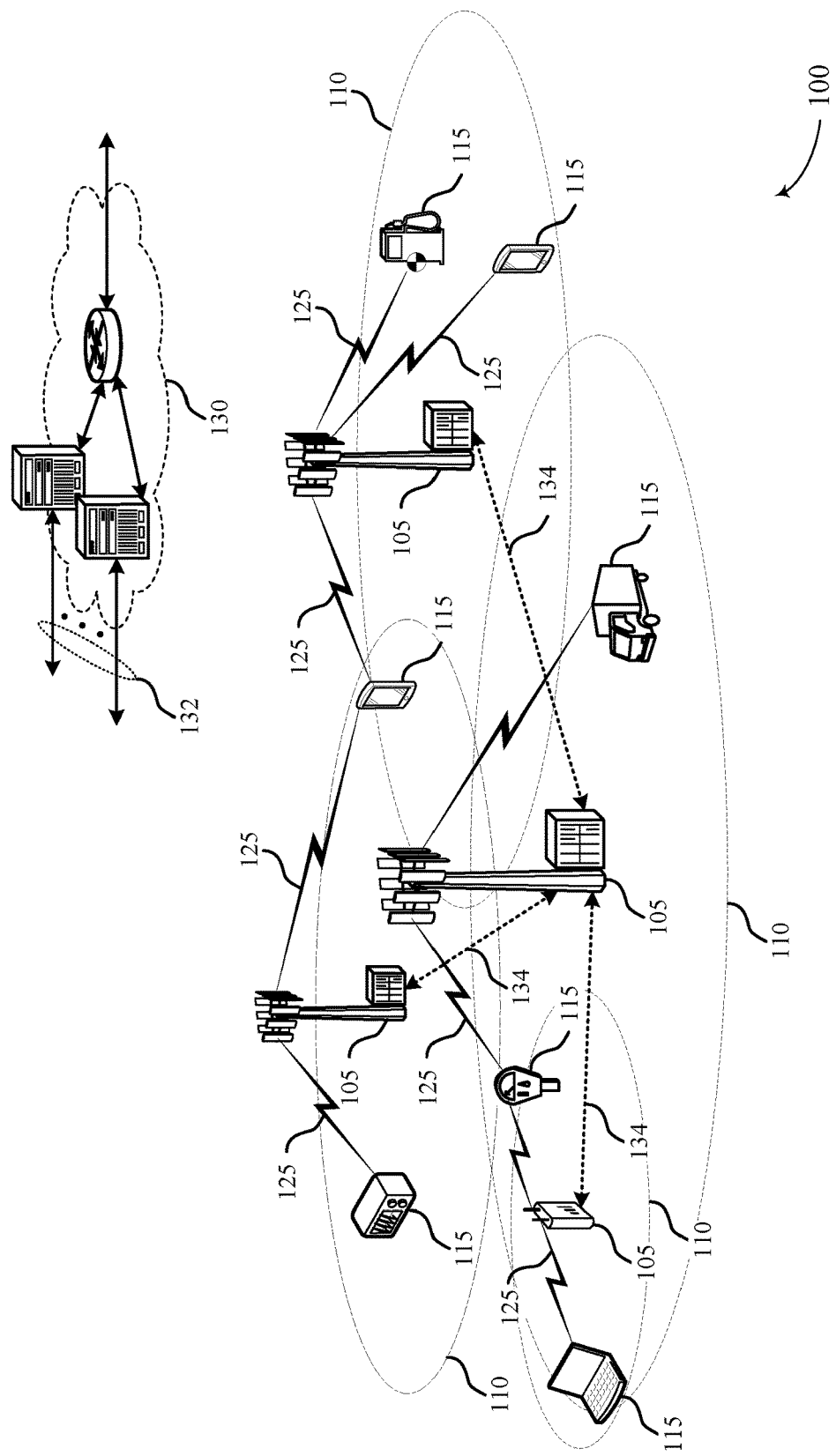
FIG. 1 illustrates an example of a wireless communications system that supports system information for enhanced machine type communication (eMTC) in accordance with various aspects of the present disclosure.

Some wireless systems support data communication technologies that allow devices to communicate with one another or a base station without human intervention. Such communication may be referred to as Machine Type Communication (MTC). In some cases, systems may support MTC by using techniques or features tailored for MTC devices. Techniques or features employed for the purpose of improving MTC may be referred to as enhanced MTC (eMTC). To support eMTC, systems may be configured to account for operating characteristics of MTC devices, which may be different from other user equipment (UE). This may include broadcasting certain MTC-specific system information using various repetition levels, transport block sizes, and the like.

An MTC device or MTC UE may be a low complexity, low cost device—relative to other UEs—and may be characterized by features such as low power operation, limited duplexing capability, and operation in environments with poor radio link conditions. Additionally, some MTC UEs are configured to operate using a narrow bandwidth, as compared with bandwidth used by other UEs or as compared with a total available system bandwidth. Systems supporting eMTC may be configured with these MTC UE characteristics in mind. In particular, in some examples and as described below, systems may support eMTC by supporting narrowband operation within a larger system bandwidth.

In some cases, systems may broadcast and MTC devices may utilize MTC-specific system information, including System Information Blocks (SIBs) tailored for MTC. As discussed below, various SIBs convey different information that may be necessary or helpful for UE operation within the system. For instance, a system may broadcast a SIB called SIB1, which may include certain necessary system information. Systems employing eMTC may broadcast MTC-specifics SIBs, which may convey necessary or useful system information for MTC operation. In some cases, systems broadcast an MTC-specific version of SIB1 (MTC SIB1).

The contents of MTC SIB1 may assist MTC UEs to evaluate cell access procedures and may define the scheduling of other system information for MTC SIBs other than MTC SIB1. Scheduling parameters for MTC SIB1 may be determined by a MTC UE based on an identifier in a separate broadcast message (e.g., in the master information block (MIB)). An MTC UE may read the broadcast message, interpret the identifier, and ascertain SIB1 scheduling parameters. The scheduling parameters may include a SIB repetition level, the transport block size (TBS), the subframe index, or the number of allocated resource blocks (RBs). The scheduling parameters may depend on a duplexing configuration, bandwidth, or frequency hopping configuration. In some cases, the repetition level may change based on the TBS or the hopping configuration. Additionally, an MTC UE's interpretation of the identifier contained in a broadcast message may depend on the duplexing configuration or bandwidth, or both.

As described below, the identifier may be a multi-bit field in the MIB. This identifier may be used to determine the scheduling parameters for SIB1. In some cases, a frequency hopping configuration may also be signaled with an additional bit in MIB. Thus, the repetition schedule may change depending on the hopping configuration. The multi-bit identifier may also correspond to the TBS, hopping configuration, subframes index, repetition level, and the number of resources. In other cases, the same TBS may be signaled, but the repetition level may change.

In some cases, a particular instance of SIB1 may be scheduled such that it overlaps with a scheduled broadcast channel transmission. That is, due to the resource constraints of narrowband operation, an anticipated transmission of SIB1 and another anticipated broadcast transmission may collide with one another. For example, an anticipated SIB1 transmission may overlap (e.g., collide) with a Physical Broadcast Channel (PBCH), primary synchronization signal (PSS), secondary synchronization signal (SSS), or the like within a 3 MHz band. In such cases, the collision may be avoided by adjusting the anticipated SIB1 transmission by, for instance, mapping SIB1 to resources not occupied by the broadcast transmission.

By way of example, it may not be suitable to map SIB1 to a physical resource block (PRB) that contains a PBCH in the same subframe or to a subcarrier that contains PBCH in the same subframe. In other examples, SIB1 may be mapped to subcarriers that contain PBCH in the same subframe; however, SIB1 may be mapped to resource elements (RE) other than those that contain PBCH, PSS, or SSS. In some cases, it may be appropriate to apply rate matching or puncturing to support mapping to available resources. In other examples, it may not be suitable to map SIB1 to any RE that may potentially include PBCH (or its repetitions). For instance, it may not be suitable to map SIB1 to REs for PBCH repetitions even when repetitions are off. In other cases, MTC devices may or may not establish a configuration for using cell-specific reference signal (CRS) for 4-antenna ports.

Aspects of the disclosure are described below in the context of a wireless communication system. Specific examples are then described for determining SIB1 scheduling resources and parameters based on the system configuration and the location of broadcast signals. These and other aspects of the disclosure are further illustrated by and described with reference to apparatus diagrams, system diagrams, and flowcharts that relate to system information for eMTC.

FIG. 1 illustrates an example of a wireless communications system 100 that supports system information for eMTC in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. Wireless communications system 100 may support communication of system information for MTC devices based on system properties and the location of broadcast signals.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. Each of the various UEs 115 may be an MTC device, a cellular phone, a wireless modem, a handheld device, a personal computer, a tablet, a personal electronic device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115 or may operate under the control of a base station controller (not shown). In some examples, base stations 105 may be macro cells, small cells, hot spots, or the like. Base stations 105 may also be referred to as eNodeBs (eNBs) 105.

As mentioned, MTC devices or MTC UEs 115 may provide for automated communication, which may include those implementing communications referred to as Machine-to-Machine (M2M) communication, MTC, eMTC, or the like. For example, M2M or MTC may refer to communications from devices that integrate sensors or meters to measure or capture information and relay that information to a central server or application program that can make use of the information or present the information to humans interacting with the program or application. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, transaction-based business charging, and wearable devices. In some cases, scheduling of system information for MTC UEs 115 may be different from system information for other UEs 115 within the system. A repetition level, transport block size (TBS), subframe index, etc. for an MTC-specific SIB1 may be different from a SIB1 intended for other UEs 115. This MTC-specific system information may account for MTC-specific characteristics. For example, an MTC UE 115 may operate using half-duplex (one-way) communications at a reduced peak rate. MTC UEs 115 may also be configured to enter a power saving "deep sleep" mode when not engaging in active communications. An MTC UE 115 may also operate in narrowband regions of a larger system bandwidth.

LTE systems, including some examples of system 100, may utilize OFDMA on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands. A narrowband region used by an MTC UE 115 may be a portion of the overall system bandwidth.

A frame structure may be used to organize time resources of wireless communications system 100. A frame may be a 10 ms interval that may be further divided into 10 equally sized sub-frames. Each sub-frame may include two consecutive time slots. Each slot may include 6 or 7 OFDMA symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a CRS and a UE-specific RS (UE-RS), which may also be referred to as a demodulation reference signal (DM-RS). UE-RS may be transmitted on the resource blocks associated with PDSCH. (Additional details of CRS and UE-RS are described below.) The number of bits carried by each resource element may depend on the modulation scheme (the configuration of symbols that may be selected during each symbol period). Thus, the more resource blocks that a UE receives and the higher the modulation scheme, the higher the data rate may be.

In some cases, time intervals may be expressed in multiples of a basic time unit (e.g., the sampling period, Ts=1/30,720,000 seconds in LTE). Frames may have a length of 10 ms (Tf =307200·Ts), and may be identified by an SFN ranging from 0 to 1023. Each frame may include ten 1 ms subframes numbered (e.g., indexed) from 0 to 9. A subframe may be further divided into two 0.5 ms slots, each of which contains a number symbol periods depending on the length of the cyclic prefix prepended to each symbol. Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

Data, which may be transmitted according to the resource structures describe above, may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. uplink (UL) transport channels may include RACH for access and uplink shared channel (UL-SCH) for data. DL physical channels may include PBCH for broadcast information, physical control format indicator channel (PCFICH) for control format information, physical downlink control channel (PDCCH) for control and scheduling information, PHICH for hybrid automatic repeat request (HARD) status messages, physical downlink shared channel (PDSCH) for user data and physical multicast channel (PMCH) for multicast data. UL physical channels may include physical random access channel (PRACH) for access messages, PUCCH for control data, and PUSCH for user data.

Carriers of system 100, which may be illustrated by communication links 125, may transmit bidirectional communications using frequency division duplex (FDD) (e.g., using paired spectrum resources) or TDD operation (e.g., using unpaired spectrum resources). Frame structures for FDD (e.g., frame structure type 1) and TDD (e.g., frame structure type 2) may be defined. For TDD frame structures, each subframe may carry UL or DL traffic, and special subframes may be used to switch between DL and UL transmission. Allocation of UL and DL subframes within radio frames may be symmetric or asymmetric and may be statically determined or may be reconfigured semi-statically. Special subframes may carry DL or UL traffic and may include a Guard Period (GP) between DL and UL traffic. Switching from UL to DL traffic may be achieved by setting a timing advance at the UE 115 without the use of special subframes or a guard period. UL-DL configurations with switch-point periodicity equal to the frame period (e.g., 10 ms) or half of the frame period (e.g., 5 ms) may also be supported. For example, TDD frames may include one or more special frames, and the period between special frames may determine the TDD DL-to-UL switch-point periodicity for the frame.

Use of TDD may offer flexible deployments without requiring paired UL-DL spectrum resources. In some TDD network deployments, interference may be caused between UL and DL communications (e.g., interference between UL and DL communication from different base stations, interference between UL and DL communications from base stations and UEs, etc.). For example, where different base stations 105 serve different UEs 115 within overlapping coverage areas according to different TDD UL-DL configurations, a UE 115 attempting to receive and decode a DL transmission from a serving base station 105 can experience interference from UL transmissions from other, proximately located UEs 115. In some examples, system 100 may utilize either or both TDD or FDD configurations. The scheduling parameters for SIB1 may depend on the communication duplexing configuration (FDD or TDD).

A UE 115, including an MTC UE 115, attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, including certain examples of system 100 operating in TDD configuration, may transmit an SSS but not a PSS. Both the PSS and the SSS may be located in the central 62 and 72 subcarriers of a carrier, respectively. After receiving the PSS and SSS, the UE 115 may receive a master information block (MIB), which may be transmitted in the physical PBCH. The MIB may contain system bandwidth information, a system frame number (SFN), and a PHICH configuration. After decoding the MIB, the UE 115 may receive one or more SIBs. For example, SIB1 may contain cell access parameters and scheduling information for other SIBs. Decoding SIB1 may enable the UE 115 to receive SIB2. SIB2 may contain radio resource control (RRC) configuration information related to RACH procedures, paging, PUCCH, PUSCH, power control, SRS, and cell barring. In some cases, the MIB may include a bitfield that usable by an MTC UE 115 to identify scheduling parameters for an MTC-specific SIB.

After completing initial cell synchronization, a UE 115 may decode the MIB, SIB1 and SIB2 prior to accessing the network. As mentioned, the MIB may be transmitted on PBCH, and it may utilize the first 4 OFDM symbols of the second slot of the first subframe of each radio frame. In some cases, PBCH might be repeated in other resources (e.g. other resource elements in the same subframe, or a different subframe). It may use the middle 6 resource block (RBs) (72 subcarriers) in the frequency domain, which, as described below, may introduce some constraints related to SIB mapping for MTC UEs 115 operating in a narrowband region. But because the MIB carries a few important pieces of information for UE initial access—including: downlink (DL) channel bandwidth in term of RBs, PHICH configuration (duration and resource assignment), and SFN—the system 100 may seek to avoid collisions between a SIB and the MIB. A new MIB may be broadcast every fourth radio frame (SFN mod 4=0) at and rebroadcast every frame (10 ms). Each repetition is scrambled with a different scrambling code. After reading a MIB (either a new version or a copy), the UE 115 may can try different phases of a scrambling code until it gets a successful cyclic redundancy check (CRC) check. The phase of the scrambling code (0, 1, 2 or 3) may enable the UE 115 to identify which of the four repetitions has been received. Thus, the UE 115 may determine the current SFN by reading the SFN in the decoded transmission and adding the scrambling code phase.

After receiving the MIB, a UE may receive one or more SIBs. Different SIBs may be defined according to the type of system information conveyed. A new SIB1 may be transmitted in the fifth subframe of every eighth frame (SFN mod 8=0) and rebroadcast every other frame (20 ms). SIB1 includes access information, including cell identity information, and it may indicate whether a UE is allowed to camp on a cell of a base station 105. SIB1 also includes cell selection information (or cell selection parameters). Additionally, SIB1 includes scheduling information for other SIBs. SIB2 may be scheduled dynamically according to information in SIB1, and includes access information and parameters related to common and shared channels. The periodicity of SIB2 can be dynamic, (e.g., it may be set to 8, 16, 32, 64, 128, 256 or 512 radio frames). Additionally, MTC-specific SIBs, including MTC SIB1, may be transmitted according to different repetition levels based on various system configurations.

After receiving synchronization information and a MIB, a UE 115 may receive one or more SIBs. Different SIBs may be defined according to the type of system information conveyed. SIB1 includes access information such as cell identity information, and may also indicate whether a UE 115 is allowed to camp on a cell. SIB1 also includes cell selection information (or cell selection parameters). Additionally, SIB1 includes scheduling information for other SIBs. SIB2 includes access information and parameters related to common and shared channels. SIB3 includes cell reselection parameters. SIB4 and SIB5 include reselection information about neighboring Long Term Evolution (LTE) cells. SIB6 through SIB8 include reselection information about non-LTE (e.g., Universal Mobile Telecommunications System (UMTS), GERAN, and code division multiple access (CDMA)) neighboring cells). SIB9 includes the name of a Home evolved node B (eNB). SIB10 through SIB12 include emergency notification information (e.g., tsunami and earthquake warnings). And SIB13 includes information related to MBMS configuration. In some cases, a SIB may be scheduled to overlap with PSS or SSS, and instead, the SIB may be mapped to resources identified to be available within the TTI. MTC-specific SIBs may include various combinations of information conveyed in the SIBs identified above; and the contents of MTC-specific SIBs may be tailored to MTC operation.

In some cases, wireless communications system 100 may utilize coverage enhancement (CE) techniques to improve the quality of a communication link 125 for UEs 115, including MTC UEs 115 located at a cell edge, operating with low power transceivers, or experiencing high interference or path loss. CE techniques may include repeated transmissions, TTI bundling, HARQ retransmission, PUSCH hopping, beamforming, power boosting, or other techniques. The CE techniques used may depend on the specific needs of UEs 115 in different circumstances. For example, TTI bundling may involve sending multiple copies of the same information in a group of consecutive TTIs rather than waiting for a negative acknowledgement (NACK) before retransmitting redundancy versions. This may be effective for users engaging in voice over Long Term evolution (VoLTE) or VOIP communications, as well as for MTC UEs 115 operating with coverage limitations. In other cases, the number of HARQ retransmissions may also be increased. Uplink data transmissions may be transmitted using frequency hopping to achieve frequency diversity. Beamforming may be used to increase the strength of a signal in a particular direction, or the transmission power may simply be increased. In some cases, one or more CE options may be combined and CE levels may be defined based on a number of decibels the techniques are expected to improve a signal (e.g., no CE, 5 dB CE, 10 dB CE, 15 dB CE, etc.). In some cases, the scheduling parameters for SIB1 may depend on the frequency hopping configuration. This configuration may be explicitly signaled in the bitfield contained within the MIB, for example.

A base station 105 may insert periodic pilot symbols such as CRS to aid UEs 115 in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. CRS may be embedded in 4 to 16 resource elements in each resource block based on the number of antenna ports or layers (up to 4) of the receiving UEs 115. In addition to CRS, which may be utilized by all UEs 115 in the geographic coverage area 110 of the base station 105, UE-RS (or DMRS) may be directed toward specific UEs 115 and may be transmitted only on resource blocks assigned to those UEs 115. In some cases, a UE may refrain from monitoring for the SIB for resource elements of the TTI that are available for CRS transmission.

Figure 2:
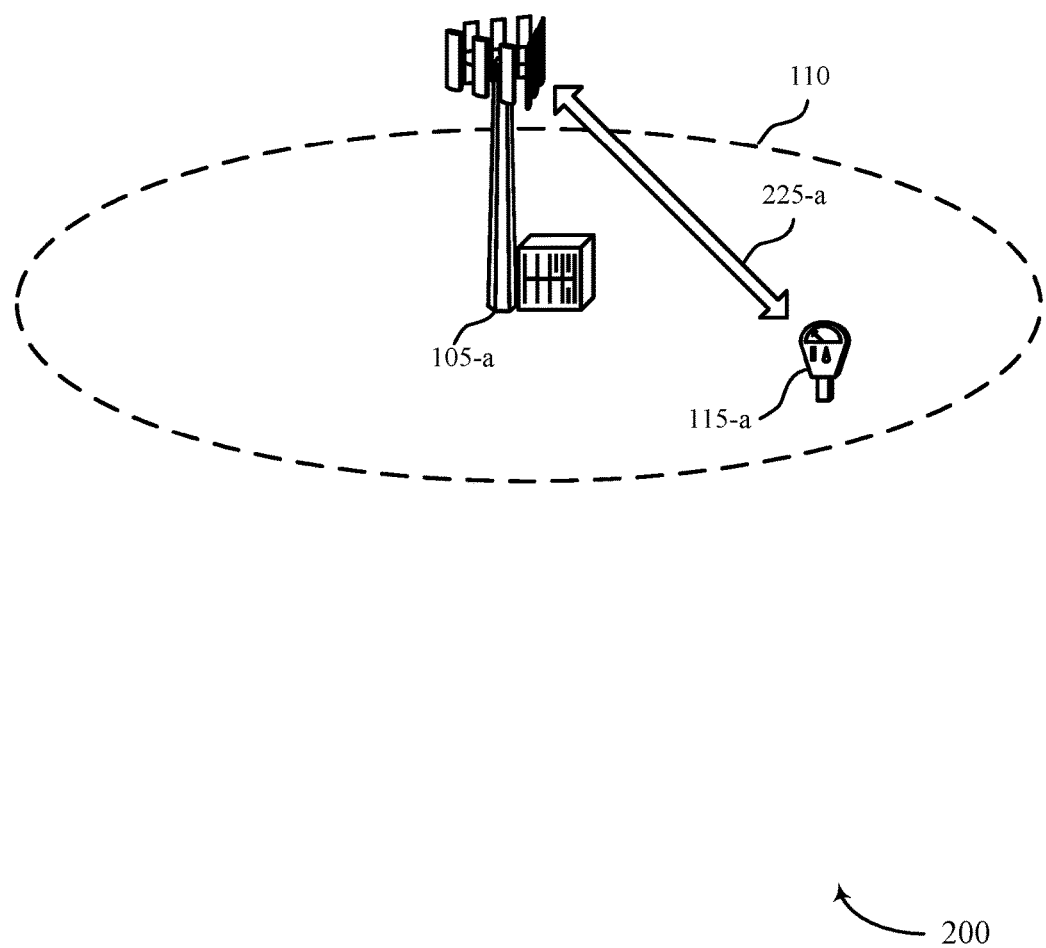
FIG. 2 illustrates an example of a wireless communications system that supports system information for eMTC in accordance with various aspects of the present disclosure.
Figure 3A:
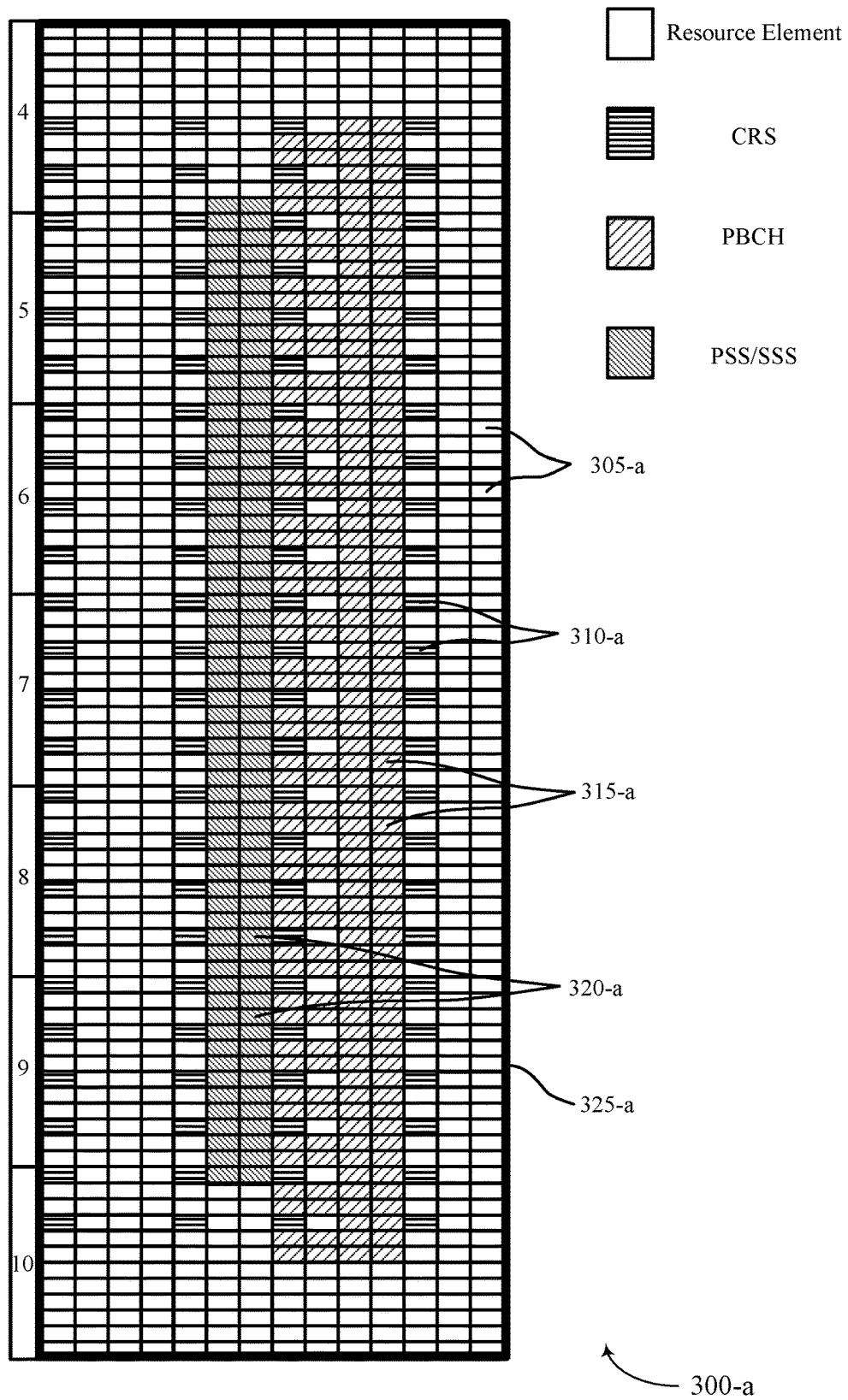
FIGS. 3A-3D illustrate examples of scheduling schemes that support system information for eMTC in accordance with various aspects of the present disclosure.
Figure 3B:
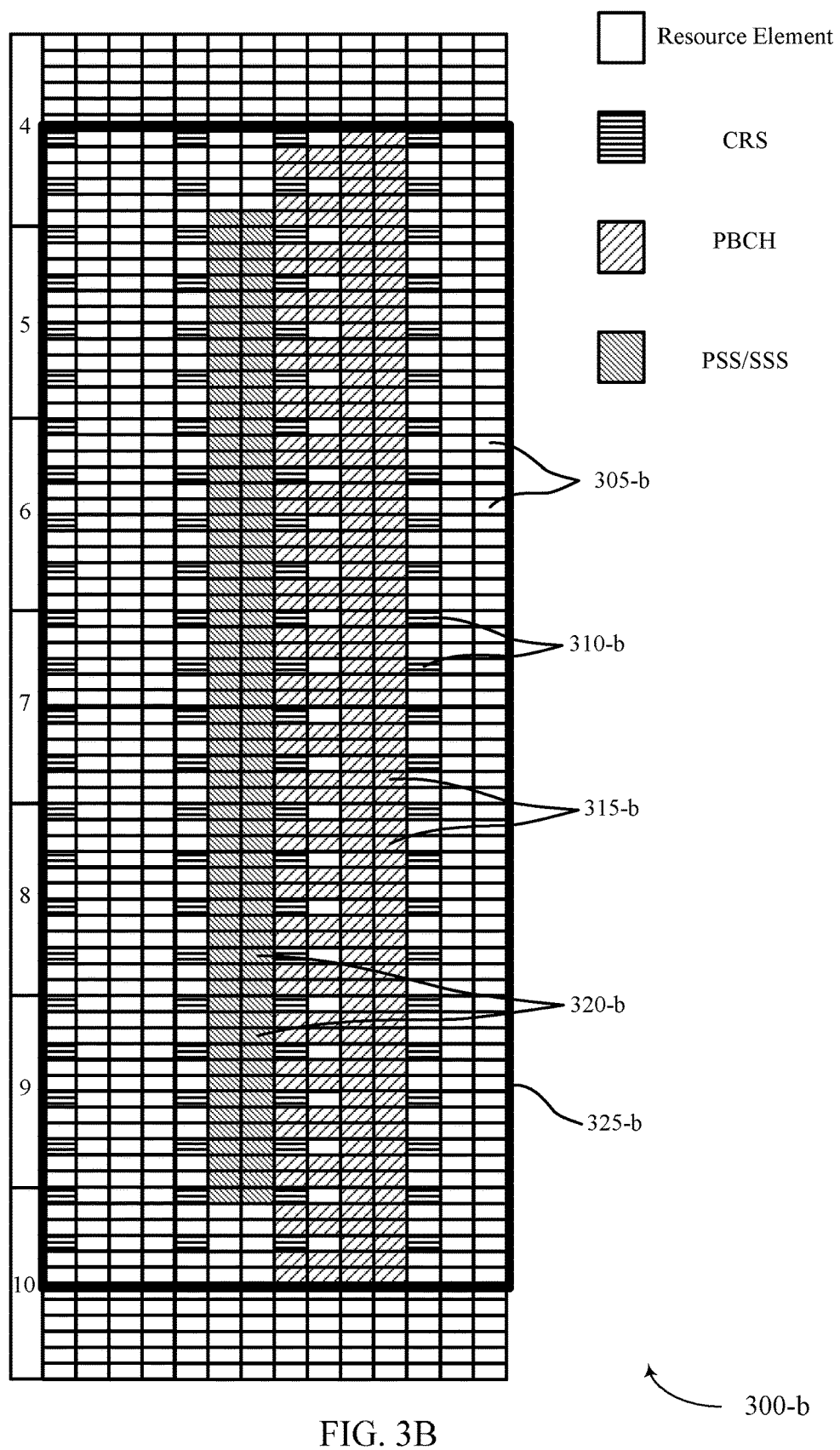
Figure 3C:
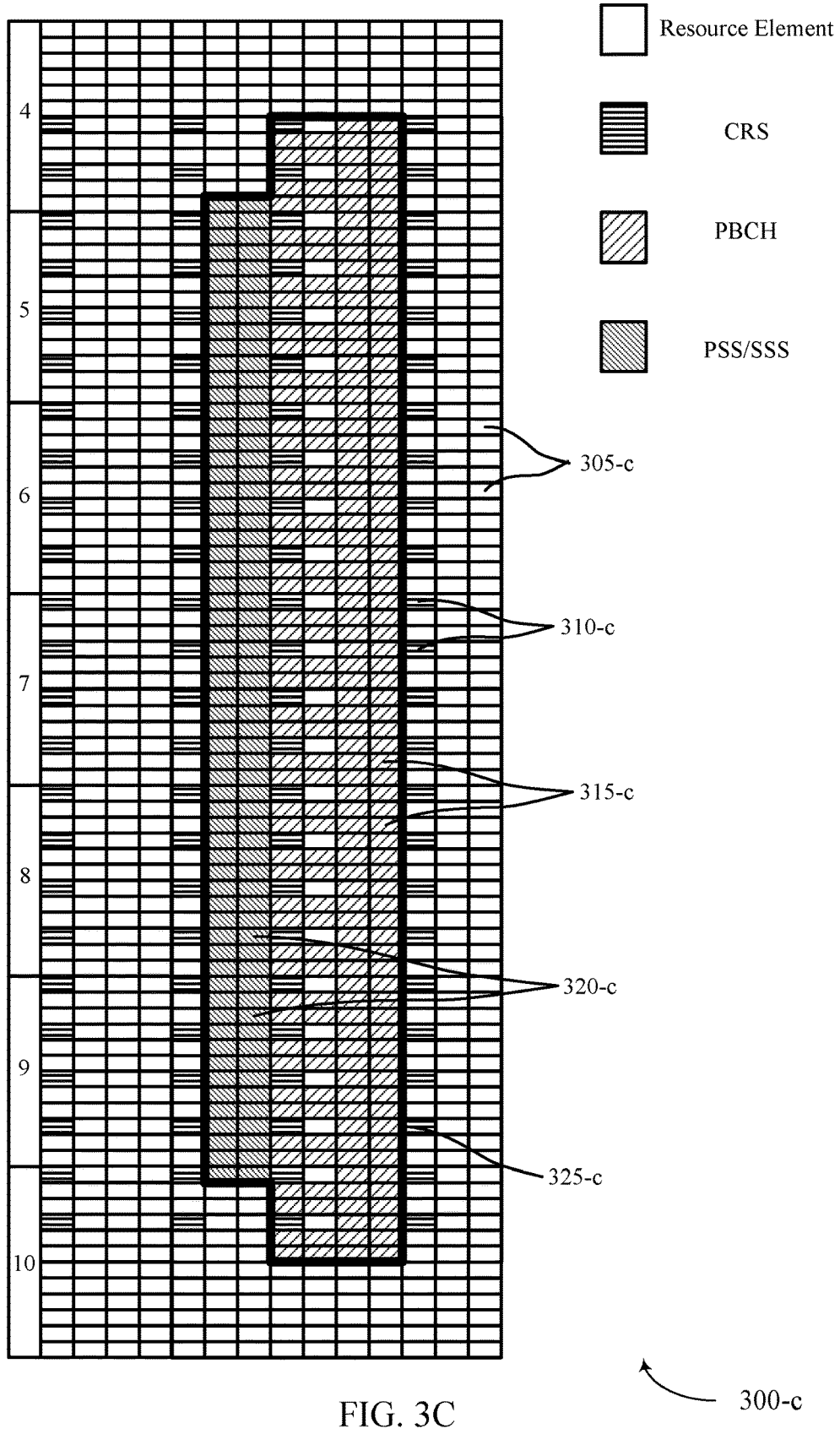
Figure 3D:
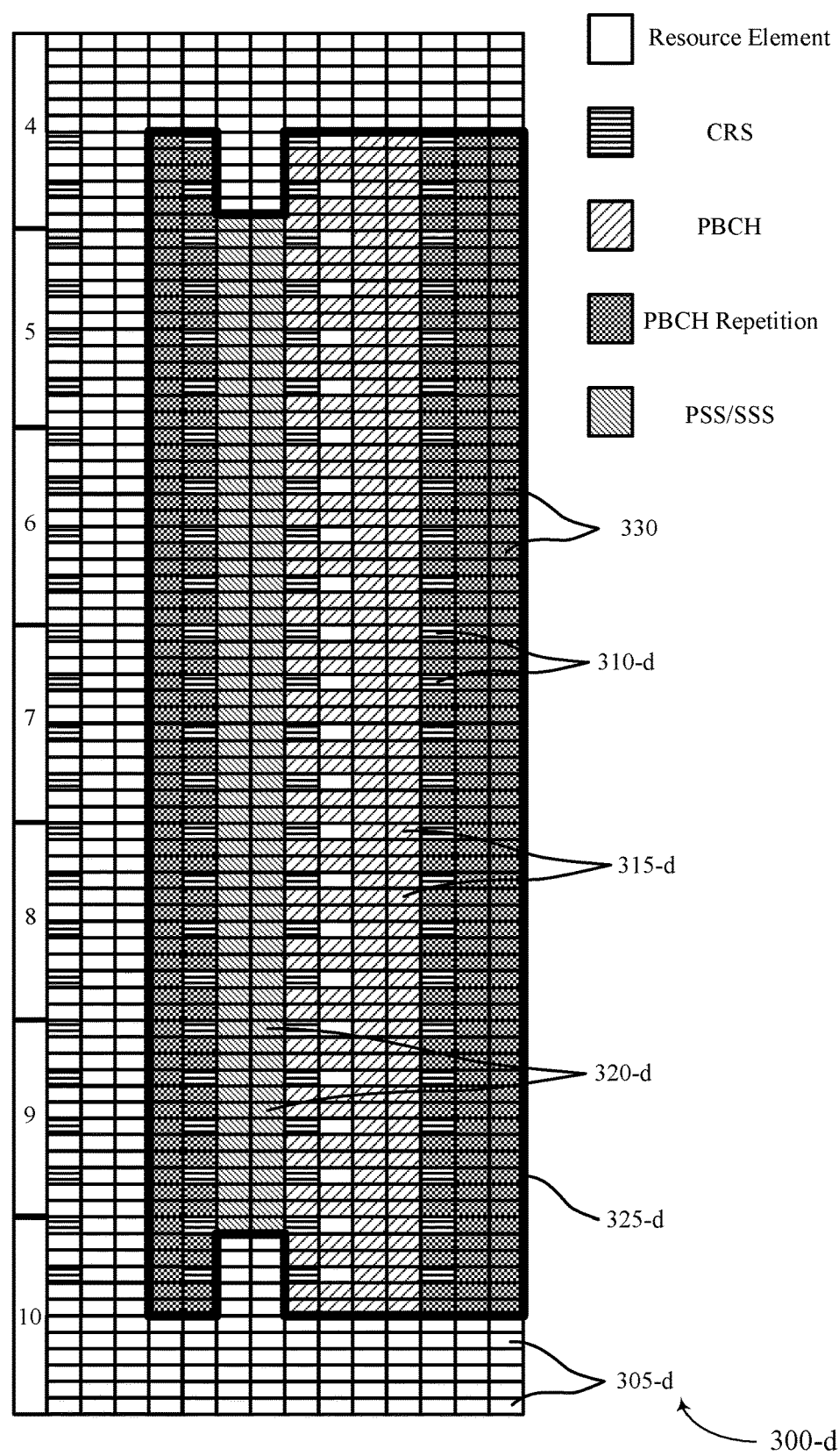

As described in this disclosure, UE 115 (such as an MTC UE 115) may determine one or more scheduling parameters for a SIB based on the bandwidth or duplexing configuration of a communication link. The scheduling parameter may depend on signaling in a broadcast communication (e.g., a MIB) or a frequency hopping configuration. In some cases, a broadcast channel may be scheduled during a TTI within a narrowband region of a system bandwidth. Available resources within the TTI may be identified and the SIB may be mapped to the available resources within the narrowband region based on the location of the broadcast information FIG. 2 illustrates an example of a wireless communications system 200 for system information for eMTC in accordance with various aspects of the present disclosure. Wireless communications system 200 may include a UE 115-a and base station 105-a, which may be examples of a UE 115 and base station 105 described with reference to FIG. 1. In some cases, UE 115-a is an MTC device, and may determine SIB1 scheduling parameters based on system properties broadcast by base station 105-a. UE 115-a may also determine the resources available for SIB1 transmission based on the location of broadcast signals from base station 105-a.

Wireless communications system 200 may support MTC operations to enable operation of low cost and low complexity devices. For example, in the context of LTE systems, such low cost UEs or MTC UEs 115 may be referred to as category 0 UEs, which may be characterized by reduced peak data rates (e.g., a possible maximum of 1000 bits for a transport block size), rank one transmission, one receive antenna, and, if half-duplex, relaxed switching timing (from transmission to reception or vice versa) from, for example, 20 μs for regular UEs to 1 ms for MTC UEs. These MTC UEs 115 may monitor DL control channels in manner similar to other UEs 115 including PDCCH) and enhanced PDCCH (ePDCCH)).

Additional MTC enhancements (referred to as eMTC) may be supported as well. For example, narrowband operation may be supported, such that MTC UE 115-a may be able to operate in a wider system bandwidth. The system 200 may support operation in multiple system bandwidth ranges (e.g., 1.4/3/5/10/15/20 MHz) via 1.4 MHz or 6 RBs, as described above. Additionally, system 200 may support coverage enhancements up to 15 dB.

The system 200 may transmit (e.g., broadcast on PDSCH) MTC SIB1 with a contents that assists UE 115-a in cell access, and which may define the scheduling of other system information, for example, MTC SIBs other than MTC SIB1 In some cases, the number of resource blocks used for MTC SIB transmission may be fixed to 6 Physical PRBs. The Transport Block Size (TBS) of MTC SIB1 may be based on a configuration of system 200, and may be indicated the MIB. The frequency location of MTC SIB1 may be derived, for example, from a Physical Cell Identification (PCID), which may be provided in the MIB. Additionally, the time location (e.g., as indicated in the MIB) for MTC SIB1 may include subframes (SFs) indexed: {0, 4, 5, 9} for FDD and {0, 1, 5, 6} for TDD. In some cases, the time location may depend on whether the subframes and frames are signaled in MIB or may be fixed in specification. Scheduling information for MTC SIBs other than MTC SIB1 may be given in MTC SIB1. The number of repetitions for MTC SIBs other than MTC SIB1 may be configurable by the network. Alternatively, some wireless systems (including system 200, in some cases) may establish a configuration for signaling the number of repetitions for MTC SIB1 via a wireless network.

Scheduling parameters for SIB1 may be determined by UE 115-a. An identifier may be contained in a broadcast message sent by base station 105-a, for example, in the MIB. SIB1 scheduling parameters may then be determined based on the identifier. The scheduling parameters may include the SIB1 repetition level, the TB), or the subframe index. The scheduling parameters may depend on the communication duplexing configuration, bandwidth, or frequency hopping configuration, or the like.

The identifier may contain a multi-bit field, which UE 115-a may use to determine the scheduling parameters for SIB1. By way of example, the following tables illustrate possible multi-bit field identifiers that may be provided in a MIB. For instance, Table 1 shows how the identifier may be used to determine the scheduling parameters and how those parameters may depend on the duplexing configuration and bandwidth:

TABLE 1

Example of bit mapping for a two-bit identifier.

| Duplexing | Bandwidth | Bits in MIB | TBS size | Subframes |
|---|---|---|---|---|
| FDD | 1.4 MHz - No hopping | 00 | Size #1 | Even #5 SF |
| | | 01 | Size #2 | Even #5 SF |
| | | 10 | Size #3 | All #5 SF |
| | | 11 | Size #4 | All #5 SF |
| | 3 MHz - No hopping | 00 | Size #1 | Even #5 SF |
| | | 01 | Size #2 | All #5 SF |
| | | 10 | Size #3 | SF #4, #5 |
| | | 11 | Size #4 | SF #4, #5 |
| | 5 MHz - Hopping | 00 | Size #1 | Even #5 SF |
| | | 01 | Size #2 | Even #5 SF |
| | | 10 | Size #3 | All #5 SF |
| | | 11 | Size #4 | All #5 SF |
| TDD | 10 MHz - Hopping | 00 | Size #1 | Even #5 SF |
| | | 01 | Size #2 | All #5 SF |
| | | 10 | Size #3 | All #5, #0 SF |
| | | 11 | Size #4 | All, #5, 0, 1, 6 |

In other cases, the hopping configuration may be signaled with an extra bit (e.g., with a total of three bits) in MIB as shown in Table 2:

TABLE 2

Three-bit mapping may signal the hopping configuration.

| Duplexing | Bandwidth | Bits in MIB | TBS size | Hopping | Subframes |
|---|---|---|---|---|---|
| FDD | 10 MHz | 000 | Size #1 | OFF | Even #5 SF |
| | | 001 | Size #2 | OFF | #5 |
| | | 010 | Size #3 | OFF | #5, #4 |
| | | 011 | Size #4 | OFF | #5, #4, #0 |
| | | 100 | Size #1 | ON | Even #5 SF |
| | | 101 | Size #2 | ON | Even #5 SF |
| | | 110 | Size #3 | ON | #5, #4 |
| | | 111 | Size #4 | ON | #5, #4 |

The repetition schedule may change depending on the hopping configuration. The multi-bit identifier may also correspond to the TBS, hopping configuration, subframes index, repetition level, and the number of resources:

TABLE 3

Three-bit identifier may map to the repetition schedule and the number of resources.

| Duplexing | Bandwidth | Bits in MIB | TBS size | Hopping | Subframes |
|---|---|---|---|---|---|
| FDD | 10 MHz | 000 | Size #1 | OFF | Even #5 SF, 6RB |
| | | 001 | Size #2 | OFF | All #5 SF, 6RB |
| | | 010 | Size #3 | OFF | #5, #4, 6RB |
| | | 011 | Size #4 | OFF | #5, #4, #0, 6RB |

TABLE 3-continued

Three-bit identifier may map to the repetition schedule and the number of resources.

| Duplexing | Bandwidth | Bits in MIB | TBS size | Hopping | Subframes |
|---|---|---|---|---|---|
| | | 100 | Size #1 | ON | Even #5 SF, 3RB |
| | | 101 | Size #2 | ON | Even #5 SF, 6RB |
| | | 110 | Size #3 | ON | #5, #4, 4RB |
| | | 111 | Size #4 | ON | #5, #4, 6RB |

In other cases, the same TBS may be signaled, but the repetition level may change, as seen in Table 4:

TABLE 4

Three-bit identifier may map to the same TBS size, but the repetition level may change.

| Duplexing | Bandwidth | Bits in MIB | TBS size | Hopping | Subframes |
|---|---|---|---|---|---|
| FDD | 10 MHz | 000 | Size #1 | OFF | Even #5 SF |
| | | 001 | Size #2 | OFF | #5 |
| | | 010 | Size #3 | OFF | #5, #4 |
| | | 011 | Size #4 | OFF | #5, #4, #9 |
| | | 100 | Size #1 | ON | Even #5 SF |
| | | 101 | Size #2 | ON | #5 SF |
| | | 110 | Size #1 | ON | #5 |
| | | 111 | Size #2 | ON | #5, #0 |
| FDD | 5 MHz | 000 | Size #1 | OFF | Even #5 SF, 3RB |
| | | 001 | Size #2 | OFF | Even #5, 6RB |
| | | 010 | Size #3 | OFF | #5, 6RB |
| | | 011 | Size #4 | OFF | #5, #4, 6RB |
| | | 100 | Size #1 | ON | Even #5, 3RB |
| | | 101 | Size #2 | ON | Even #5, 6RB |
| | | 110 | Size #1 | ON | #5, 6RB |
| | | 111 | Size #2 | ON | #5, #4, 6RB |

In some cases, an anticipated transmission of SIB1 may overlap with another anticipated broadcast signal. This may be due to a narrowband operation of system 200. That is, UE 115-*a* may be a narrowband MTC device. Certain critical broadcast information may be restricted to resources within the narrowband region. Thus, additional resource for other transmissions, such as SIB1, may be scarce. For example, an anticipated SIB1 transmission may overlap with (e.g., be expected to collide with) PBCH, PSS, or SSS in certain subframes when system 200 operates with a 3 MHz bandwidth to communicate with UE 115-*a*. In order to avoid a collision, SIB1 may be mapped to resources within the narrowband that are not occupied by PBCH, PSS, or SSS.

FIGS. 3A-D illustrate examples of scheduling schemes 300-*a*, 300-*b*, 300-*c*, and 300-*d* that support system information for eMTC in accordance with various aspects of the present disclosure. Scheduling schemes 300-*a*, 300-*b*, 300-*c*, and 300-*d* may include scheduling consistent with the present disclosure, and illustrate a resource mapping to avoid collisions, as described above.

Resource elements 305 may represent time and frequency units for transmission of individual symbols. For example, a resource element 305 may cover one subcarrier (e.g., 15 kHz subcarrier) and 1 symbol period (e.g., approximately 1/15 k seconds). CRS elements 310 may represent time and frequency units which may be used for the transmission of reference signals for channel estimation as described in FIG. 1. In some cases, the number of CRS elements 310 that are used may depend on the number of antenna ports used for communication (e.g., 4 ports, as illustrated in FIGS. 3A-3D). PBCH elements 315 may represent time and frequency units for transmission of parameters that may be used for PBCH. In some cases, PBCH may be used for initial access of the cell (e.g., for the transmission of a MIB). PSS or SSS elements 320 may represent time and frequency units for transmission of information that may be used for cell synchronization.

Scheduling scheme 300-*a* is an example in which the scheduling of a MTC SIB1 may depend on, or be determined, based on the presence of CRS elements 310-*a*, PBCH elements 315-*a*, and PSS or SSS elements 320-*a* within a TTI. For example, in some cases the scheduling of an MTC SIB1 may be based on region 325-*a*. As illustrated, region 325-*a* may include the resource blocks monitored by a UE 115 (such as an MTC device) during a TTI including PBCH elements 315-*a* or PSS or SSS elements 320-*a*. Thus, MTC SIB1 may be mapped to resources exclusive of (e.g., outside of) region 325-*a*.

Scheduling scheme 300-*b* is an example in which the scheduling of a MTC SIB1 may depend on the presence of CRS elements 310-*b*, PBCH elements 315-*b*, and PSS or SSS elements 320-*b*. For example, in some cases, the scheduling of a MTC SIB1 may be based on an region 325-*b*. As illustrated, in some examples, region 325-*b* may include those subcarriers monitored by a UE 115 (such as an MTC device) during a TTI that include PBCH elements 315-*b* or PSS or SSS elements 320-*b*. Thus, MTC SIB1 may be mapped to resources exclusive of (e.g., outside of) region 325-*b*.

Scheduling scheme 300-*c* is an example in which the scheduling of a MTC SIB1 may depend on the presence of CRS elements 310-*c*, PBCH elements 315-*c*, and PSS or SSS elements 320-*c*. For example, in some cases the scheduling of a MTC SIB1 may be based on an region 325-*c*. As illustrated in some examples, region 325-*c* may include PBCH elements 315-*c* or PSS or SSS elements 320-*c*. Additionally, region 325-*c* may or may not include the RE available for CRS transmission but not currently in use. Thus, MTC SIB1 may be mapped to resources exclusive of (e.g., outside of) region 325-*c*.

Scheduling scheme 300-*d* is an example in which the scheduling of a MTC SIB1 may depend on the presence of CRS elements 310-*d*, PBCH elements 315-*d*, and PSS or SSS elements 320-*d*. For example, in some cases the scheduling of a MTC SIB1 may be based on an region 325-*d*. As illustrated in some examples, region 325-*d* may include PBCH elements 315-*d*, or PSS or SSS elements 320-*d*, as well as PBCH repetition resource elements 330-*d*. PBCH repetition resource elements 330-*d* may be those resource elements available for PBCH repetition. Additionally, region 325-*d* may or may not include the RE available for CRS transmission but not currently in use. Thus, MTC SIB1 may be mapped to resources exclusive of (e.g., outside of) region 325-*d*.

Figure 4:
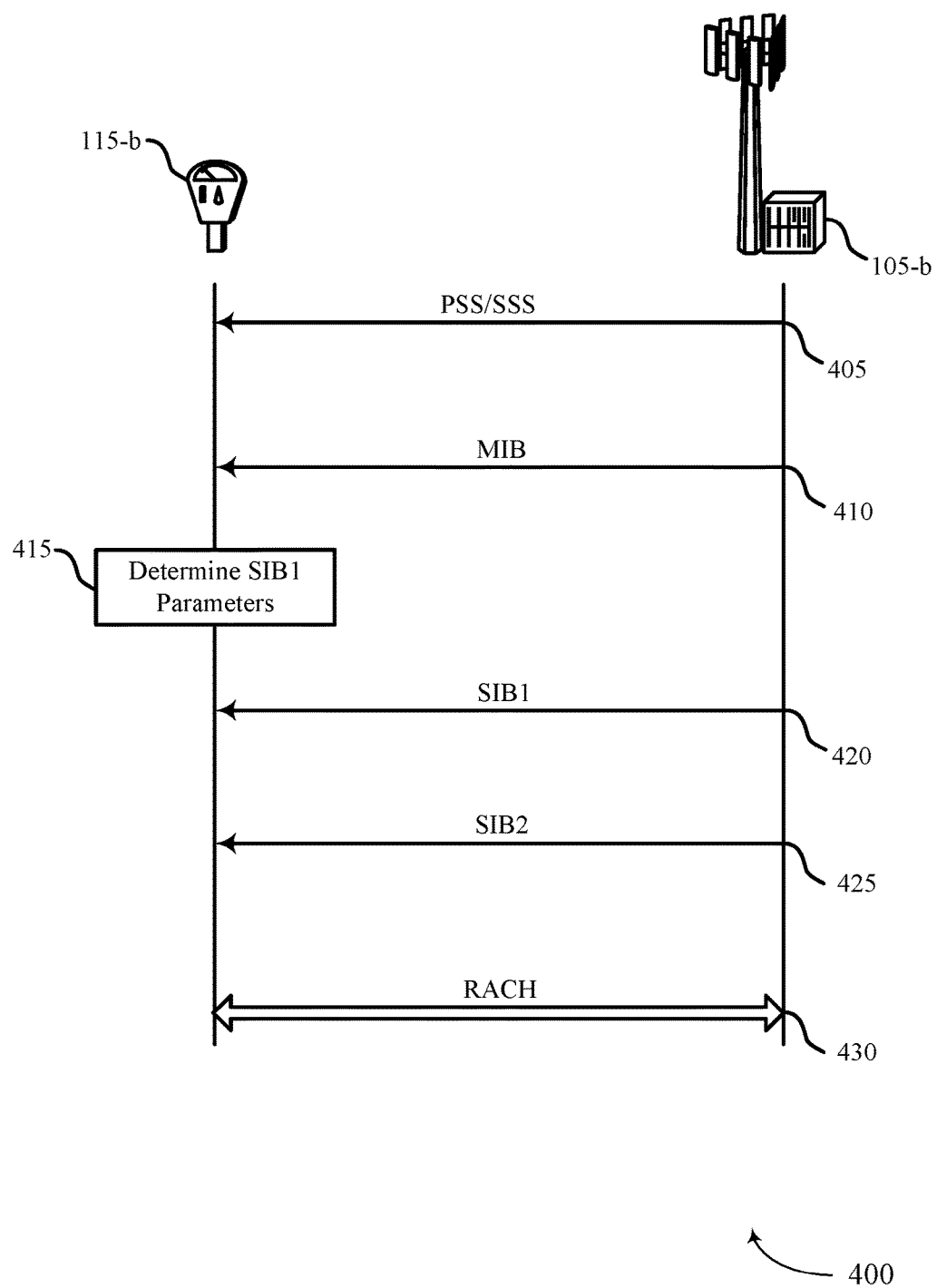
FIG. 4 illustrates an example of a process flow in a system that supports system information for eMTC in accordance with various aspects of the present disclosure.

FIG. 4 illustrates an example of a process flow 400 in a system that supports system information for eMTC in accordance with various aspects of the present disclosure. Process flow 400 may include a UE 115-*b* and base station 105-*b*, which may be examples of a UE 115 and base station 105 described with reference to FIGS. 1-2. For example, UE 115-*b* may be an MTC device. Process flow 400 may illustrate aspects of SIB coordination and provisioning in a wireless communication system between base station 105-*b* and UE 115-*b*. The described method of wireless communication may include determining a bandwidth or duplexing configuration (e.g. a frequency hopping configuration). In some examples, the bandwidth and duplexing configuration may be determined based on broadcast communication, and the broadcast communication may include a MIB, PSS, or SSS.

Thus, at 405, base station 105-*b* may transmit the PSS or SSS, which may be received by UE 115-*b*. In some cases, UE 115-*b* may determine aspects of the system properties based on the PSS or SSS, or both. For example, UE 115-*b* may determine whether the duplexing configuration for the system is TDD or FDD based on the SSS.

At 410, base station 105-*b* may transmit (e.g., broadcast on PBCH) a MIB, which may be received by UE 115-*b*. That is, UE 115-*b* may receive the MIB, which may include a signal (e.g. a bit field) indicative of the scheduling parameter for a SIB as well as information about system bandwidth. This determination may be based on the bandwidth or duplexing configuration of the system. In some cases, the broadcast communication may include a MIB transmitted in a PBCH.

At block 415, UE 115-*b* may determine a scheduling parameter for a SIB based on the bandwidth or duplexing configuration of the system. In some examples, the scheduling parameter for the SIBs is determined and may be based on the frequency hopping configuration. In other examples, the scheduling parameter for the SIB may include a repetition level, a transport block size, a subframe index, a number of assigned resource blocks, or the like. For example, UE 115-*b* may determine scheduling parameters based on a bit field in the MIB, and interpret the bit field based on the duplexing configuration and the bandwidth (i.e., the portion of the system bandwidth used for MTC communications). In some cases, the SIB may be an MTC SIB1.

At 420, UE 115-*b* may receive SIB1 according to the scheduling parameters. At 425, UE 115-*b* may receive SIB2 according to the information received in SIB1.

In some examples, a broadcast channel, such as PBCH is scheduled during the same TTI as the SIB and within the narrowband region of a system bandwidth occupied by the broadcast channel. In such cases, base station 105-*b* may map the SIB to resources within the narrowband region based on identifying available resources of the TTI. For example, FIGS. 3A-3D illustrate possible scheduling schemes consistent with such mapping. In some cases, base station 105-*b* may refrain from mapping the SIB to resources blocks within the TTI that include the broadcast channel. In some examples, the resources available for receiving the SIB may include subcarriers that exclude the broadcast channel and base station 105-*b* may map the SIB within the TTI onto subcarriers that exclude the broadcast channel. In other examples, the resources available for receiving the SIB include available portions of subcarriers within the narrowband region, where the subcarriers include the broadcast channel, the available portions include resource elements that exclude the broadcast channel, and base station 105-*b* may map the SIB within the TTI onto the available portions of the subcarriers.

UE 115-*b* may identify resources available for receiving a SIB during the TTI and may monitor for the SIB within the narrowband region based on identifying the available resources. The available resources may include resource blocks of the TTI that exclude the broadcast channel. In such examples, UE 115-*b* may monitor for the SIB on the resource blocks of the TTI that exclude the broadcast channel.

In some examples, the resources available for receiving the SIB include subcarriers of the narrowband region that exclude the broadcast channel. In such cases, UE 115-*b* may monitor for the SIB during the TTI on the subcarriers that exclude the broadcast channel. In other examples, the resources available for receiving the SIB include available portions of subcarriers within the narrowband region and UE 115-*b* may monitor for the SIB during the TTI on the available portions of the subcarriers. In other examples, UE 115-*b* may identify a first set of resource elements available for a broadcast channel repetition and monitor for the SIB during the TTI on a second set of resource elements that excludes resource elements of the first set.

In some cases, monitoring for the SIB includes monitoring on resource elements of the TTI that are available for and exclude a CRS transmission. In some cases, UE 115-*b* may refrain from monitoring resource elements available for CRS transmission.

At 430, base station 105-*b* and UE 115-*b* may establish a Random Access Channel (RACH) link to facilitate communication via the wireless network based on information received in SIB1 and SIB2.

Figure 5:
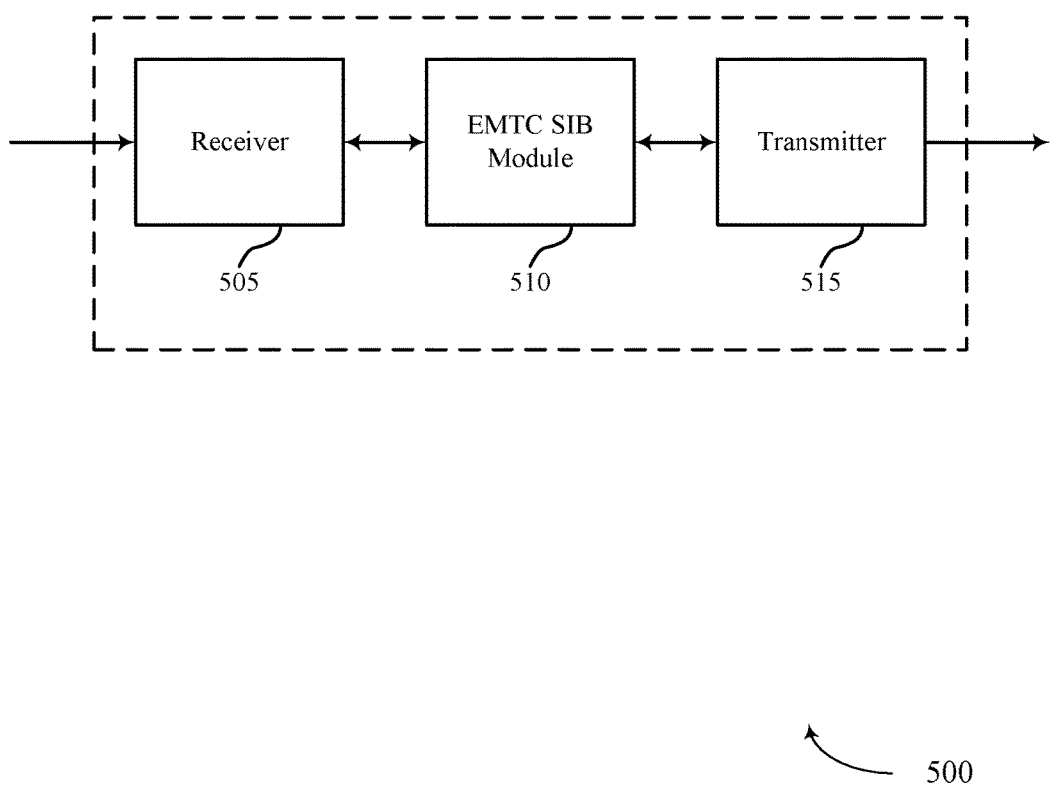
FIGS. 5-7 show block diagrams of a wireless device or devices that support system information for eMTC in accordance with various aspects of the present disclosure.

FIG. 5 shows a block diagram of a wireless device 500 configured for system information for eMTC in accordance with various aspects of the present disclosure. Wireless device 500 may be an example of aspects of a UE 115 described with reference to FIGS. 1-4. Wireless device 500 may include a receiver 505, an eMTC SIB module 510, or a transmitter 515. Wireless device 500 may also include a processor. Each of these components may be in communication with each other.

The receiver 505 may receive information such as packets, user data, or control information associated with various information channels (e.g., control channels, data channels, and information related to system information for eMTC, etc.). Information may be passed on to the eMTC SIB module 510, and to other components of wireless device 500.

The eMTC SIB module 510 may determine a bandwidth or duplexing configuration for communication with a base station, determine a scheduling parameter for a SIB based on the bandwidth or duplexing configuration, and receive the SIB according to the scheduling parameter.

The transmitter 515 may transmit signals received from other components of wireless device 500. In some examples, the transmitter 515 may be collocated with the receiver 505 in a transceiver module. The transmitter 515 may include a single antenna, or it may include a plurality of antennas.

Figure 6:
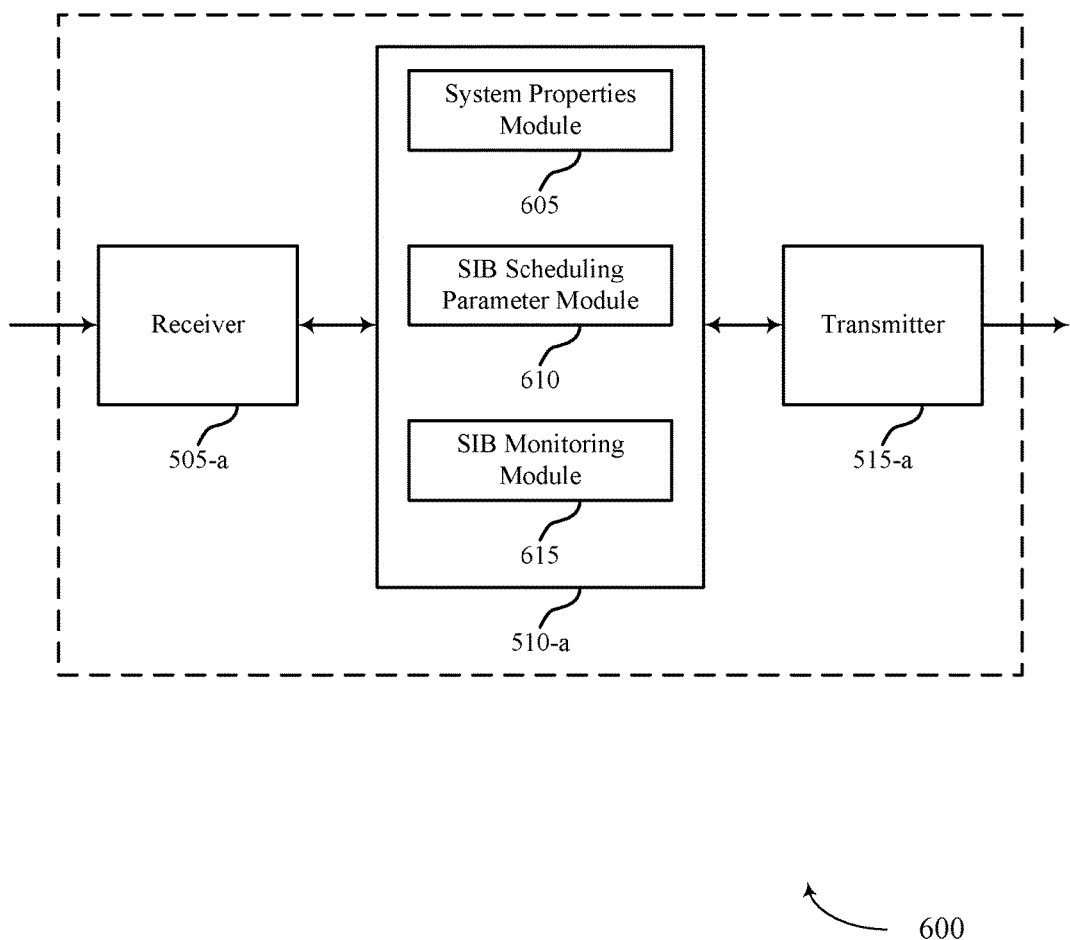

FIG. 6 shows a block diagram of a wireless device 600 for system information for eMTC in accordance with various aspects of the present disclosure. Wireless device 600 may be an example of aspects of a wireless device 500 or a UE 115 described with reference to FIGS. 1-5. Wireless device 600 may include a receiver 505-*a*, an eMTC SIB module 510-*a*, or a transmitter 515-*a*. Wireless device 600 may also include a processor. Each of these components may be in communication with each other. The eMTC SIB module 510-*a* may also include a system properties module 605, a SIB scheduling parameter module 610, and a SIB monitoring module 615.

The receiver 505-*a* may receive information which may be passed on to eMTC SIB module 510-*a*, and to other components of wireless device 600. The eMTC SIB module 510-*a* may perform the operations described with reference to FIG. 5. The transmitter 515-*a* may transmit signals received from other components of wireless device 600.

The system properties module 605 may determine a bandwidth or duplexing configuration for communication with a base station as described with reference to FIGS. 2-4. In some examples, the bandwidth and duplexing configuration may be determined based on a broadcast communication. In some examples, the broadcast communication includes as least one of a MIB, a PSS, or an SSS.

The SIB scheduling parameter module 610 may determine a scheduling parameter for a SIB based on the bandwidth or duplexing configuration as described with reference to FIGS. 2-4. In some examples, the scheduling parameter for the SIB includes at least one of a repetition level, a transport block size, or a subframe index. In some examples, the scheduling parameter for the SIB includes a number of assigned resource blocks. In some examples, the SIB includes an MTC SIB1.

The SIB monitoring module 615 may receive the SIB according to the scheduling parameter as described with reference to FIGS. 2-4. The SIB monitoring module 615 may also monitor for the SIB within the narrowband region based on identifying the available resources. The SIB monitoring module 615 may also refrain from monitoring for the SIB during the TTI based on the determination that the broadcast channel is scheduled during the TTI. In some examples, the resources available for receiving the SIB include subcarriers of the narrowband region that exclude the broadcast channel, and monitoring for the SIB includes monitoring for the SIB during the TTI on the subcarriers that exclude the broadcast channel. In some examples, the resources available for receiving the SIB include available portions of subcarriers within the narrowband region, the subcarriers include the broadcast channel and the available portions include resource elements that exclude the broadcast channel, and monitoring for the SIB includes monitoring for the SIB during the TTI on the available portions of the subcarriers. The SIB monitoring module 615 may also refrain from monitoring resource elements available for CRS transmission.

Figure 7:
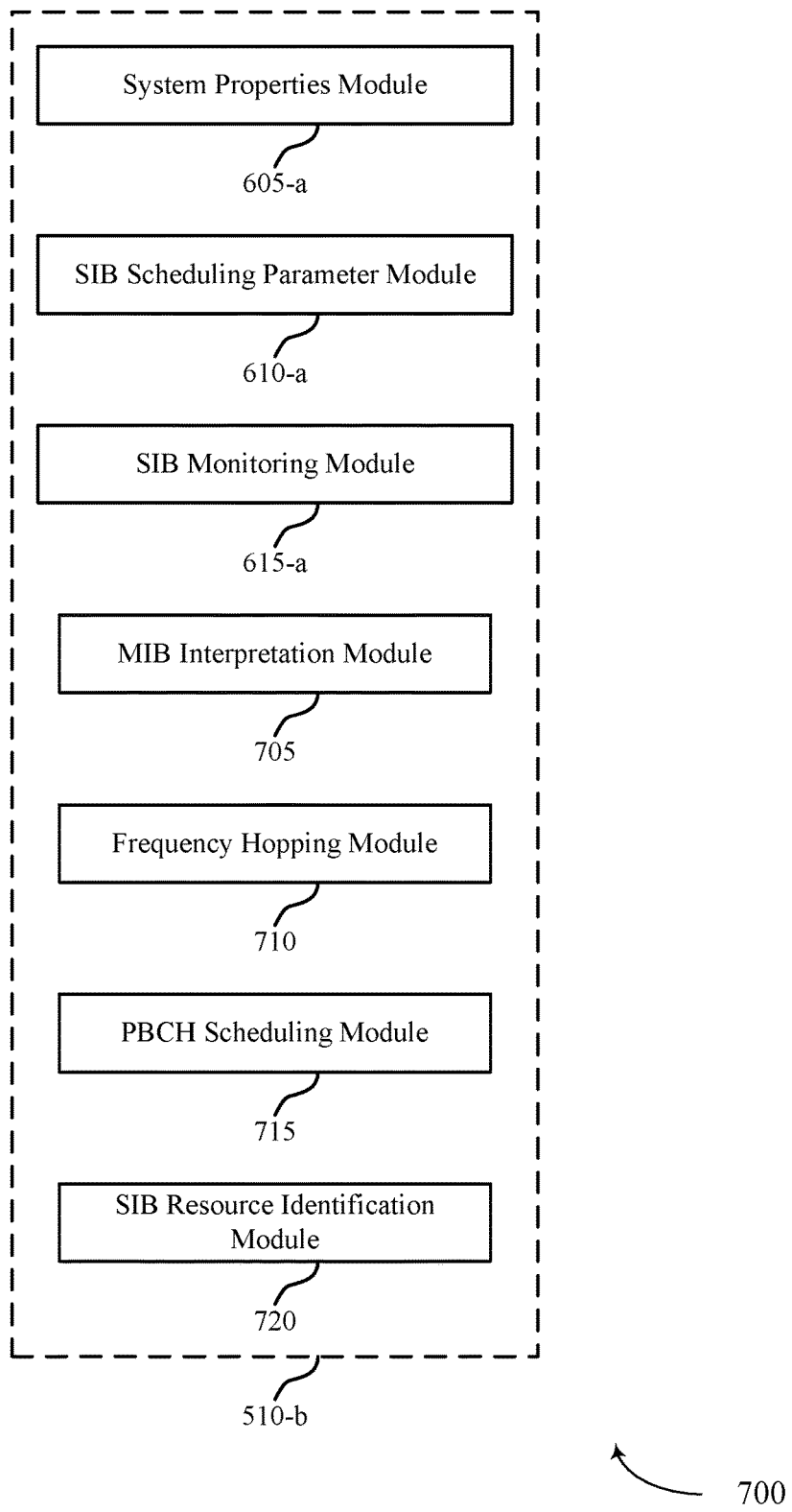

FIG. 7 shows a block diagram 700 of an eMTC SIB module 510-*b* which may be a component of a wireless device 500 or a wireless device 600 for system information for eMTC in accordance with various aspects of the present disclosure. The eMTC SIB module 510-*b* may be an example of aspects of an eMTC SIB module 510 described with reference to FIGS. 5-6. The eMTC SIB module 510-*b* may include a system properties module 605-*a*, a SIB scheduling parameter module 610-*a*, and a SIB monitoring module 615-*a*. Each of these modules may perform the functions described with reference to FIG. 6. The eMTC SIB module 510-*b* may also include a MIB interpretation module 705, a frequency hopping module 710, a PBCH scheduling module 715, and a SIB resource identification module 720.

The MIB interpretation module 705 may receive signaling indicative of the scheduling parameter for the SIB in a broadcast communication, and determining the scheduling parameter may include interpreting the received signaling based on the determined bandwidth or duplexing configuration as described with reference to FIGS. 2-4. In some examples, the broadcast communication includes a MIB. In some examples, the signaling includes a bit field indicative of the scheduling parameter for the SIB.

The frequency hopping module 710 may determine a frequency hopping configuration for communication with the base station, and the scheduling parameter for the SIB may be determined based on the frequency hopping configuration as described with reference to FIGS. 2-4.

The PBCH scheduling module 715 may determine that a broadcast channel is scheduled during a TTI within a narrowband region of a system bandwidth as described with reference to FIGS. 2-4.

The SIB resource identification module 720 may identify resources available for receiving a SIB during the TTI based on the determination as described with reference to FIGS. 2-4. In some examples, the available resources include resource blocks of the TTI that exclude the broadcast channel, and monitoring for the SIB includes monitoring for the SIB on the resource blocks of the TTI that exclude the broadcast channel. The SIB resource identification module 720 may also identify a first set of resource elements available for a broadcast channel repetition, and monitoring for the SIB may include monitoring for the SIB during the TTI on a second set of resource elements that excludes resource elements of the first set. In some examples, monitoring for the SIB includes monitoring on resource elements of the TTI that are available for a CRS transmission. The SIB resource identification module 720 may identify a one or more sets of resource elements of the TTI available for a broadcast channel repetition.

Figure 8:
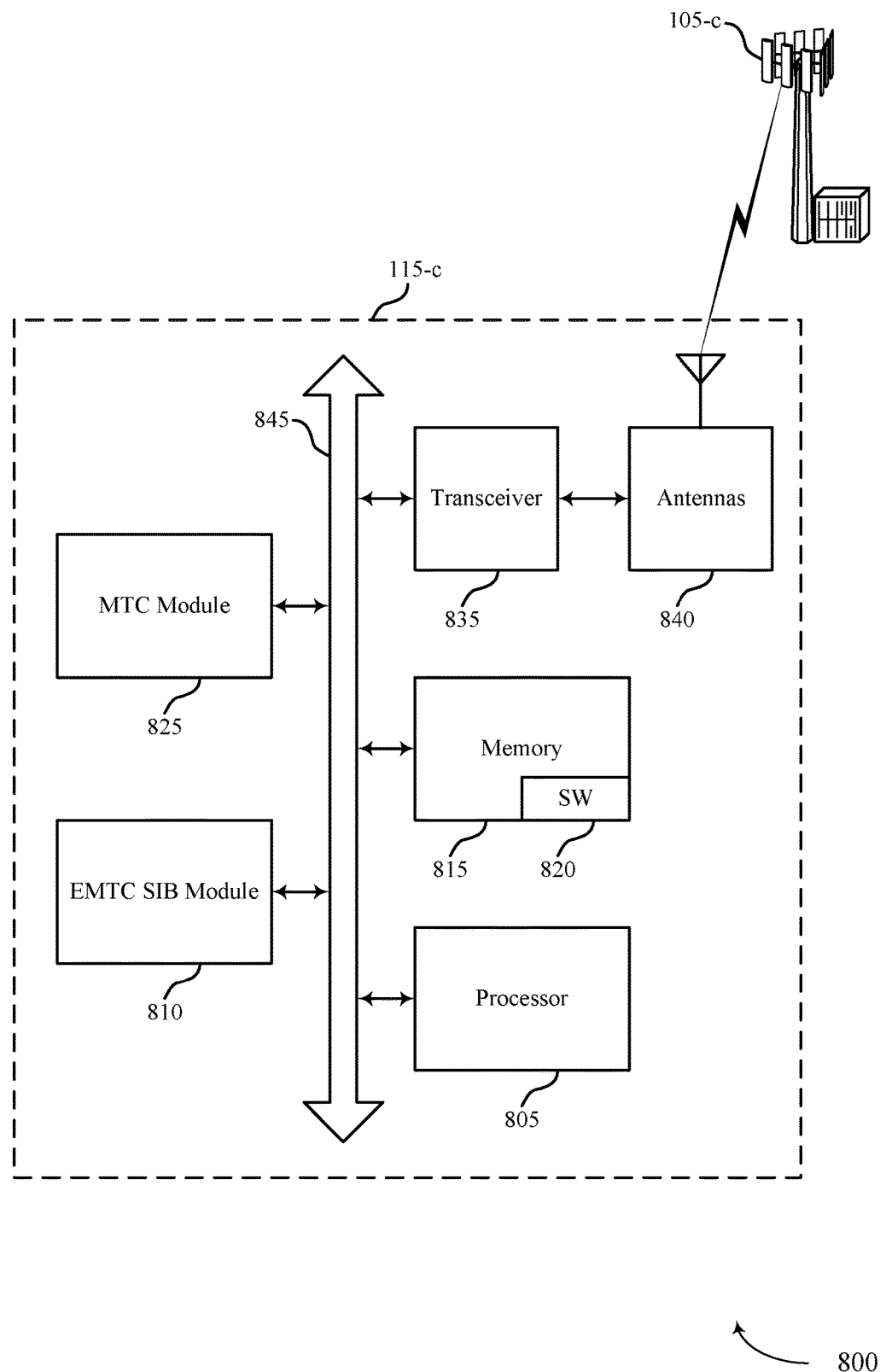
FIG. 8 illustrates a block diagram of a system, including a user equipment (UE), that supports system information for eMTC in accordance with various aspects of the present disclosure.

FIG. 8 shows a diagram of a system 800 including a UE 115 configured for system information for eMTC in accordance with various aspects of the present disclosure. System 800 may include UE 115-*c*, which may be an example of a wireless device 500, a wireless device 600, or a UE 115 described with reference to FIGS. 1, 2 and 5-7. UE 115-*c* may include an eMTC SIB module 810, which may be an example of an eMTC SIB module 510 described with reference to FIGS. 5-7. UE 115-*c* may also include a MTC module 825. The MTC module 825 may enable MTC communications as described in the present disclosure. For example, MTC module 825 may enable narrowband communications, frequency hopping, monitoring of MTC specific system information, or other power conservation techniques. UE 115-*c* may also include components for bi-directional voice and data communications including components for transmitting communications and components for receiving communications. For example, UE 115-*c* may communicate bi-directionally with base station 105-*c*.

UE 115-*c* may also include a processor 805, and memory 815 (including software (SW) 820), a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station 105 or another UE 115. The transceiver 835 may include a modem to modulate the packets and provide the modulated packets to the antenna(s) 840 for transmission, and to demodulate packets received from the antenna(s) 840. While UE 115-*c* may include a single antenna 840, UE 115-*c* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., system information for eMTC, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an application specific integrated circuit (ASIC), etc.)

Figure 9:
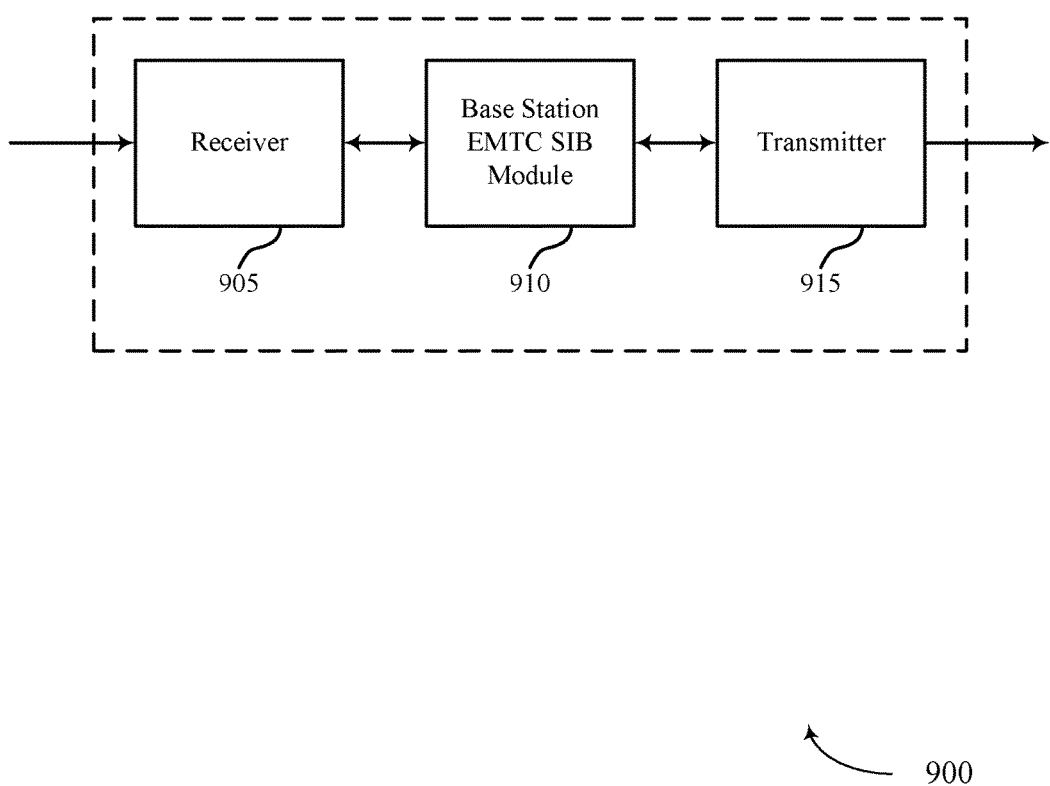
FIGS. 9-11 show block diagrams of a wireless device or devices that support system information for eMTC in accordance with various aspects of the present disclosure.

FIG. 9 shows a block diagram of a wireless device 900 configured for system information for eMTC in accordance with various aspects of the present disclosure. Wireless device 900 may be an example of aspects of a base station 105 described with reference to FIGS. 1-8. Wireless device 900 may include a receiver 905, a base station eMTC SIB module 910, or a transmitter 915. Wireless device 900 may also include a processor. Each of these components may be in communication with each other.

The receiver 905 may receive information such as packets, user data, or control information associated with various information channels (e.g., control channels, data channels, and information related to system information for eMTC, etc.). Information may be passed on to the base station eMTC SIB module 910, and to other components of wireless device 900.

The base station eMTC SIB module 910 may determine a bandwidth or duplexing configuration for communication with a UE or group of UEs, determine a scheduling parameter for a SIB based on the bandwidth or duplexing configuration, and transmit the SIB according to the scheduling parameter.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas.

Figure 10:
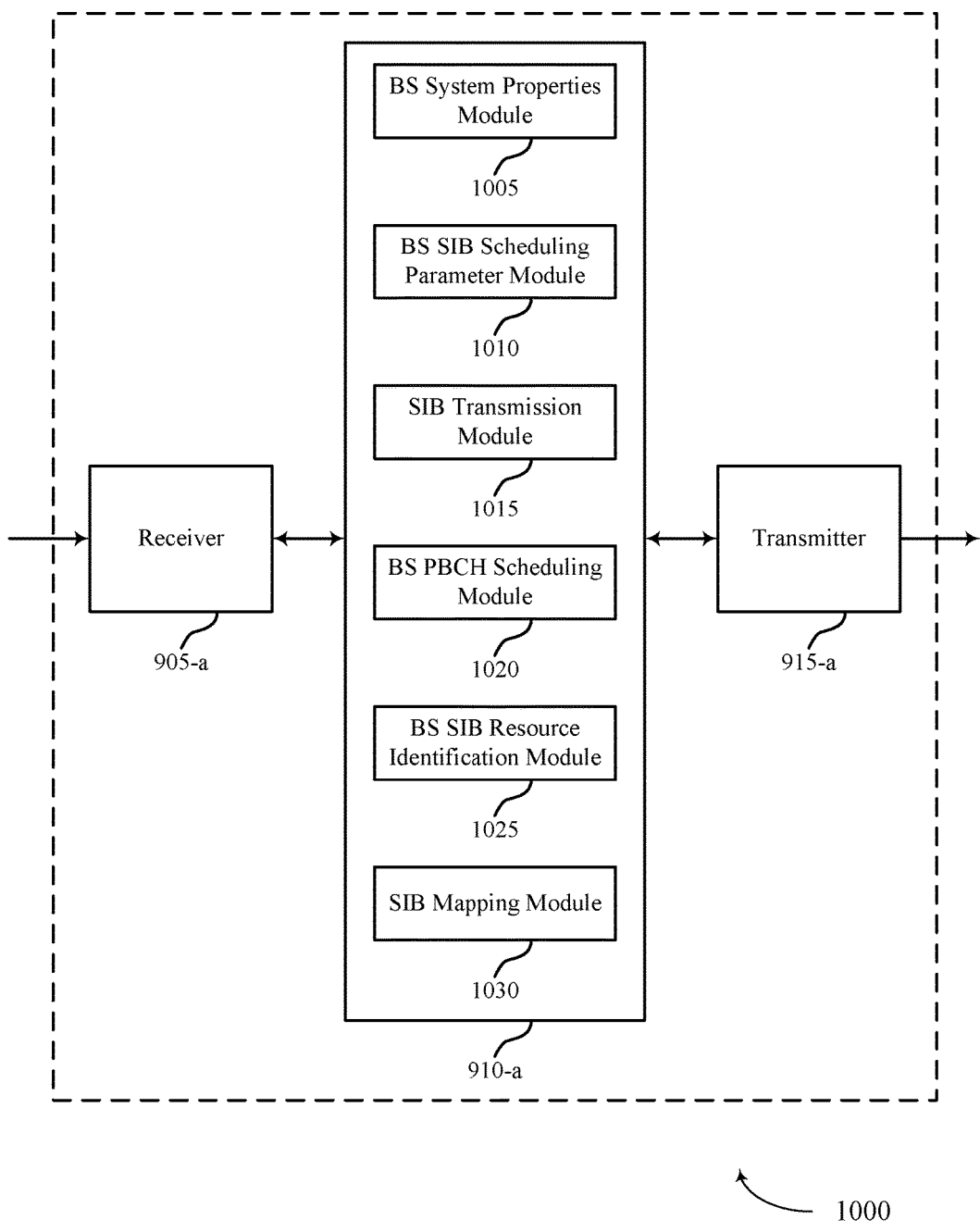

FIG. 10 shows a block diagram of a wireless device 1000 for system information for eMTC in accordance with various aspects of the present disclosure. Wireless device 1000 may be an example of aspects of a wireless device 900 or a base station 105 described with reference to FIGS. 1-9. Wireless device 1000 may include a receiver 905-a, a base station eMTC SIB module 910-a, or a transmitter 915-a. Wireless device 1000 may also include a processor. Each of these components may be in communication with each other. The base station eMTC SIB module 910-a may also include a BS system properties module 1005, a BS SIB scheduling parameter module 1010, a SIB transmission module 1015, a BS PBCH scheduling module 1020, a BS SIB resource identification module 1025, and a SIB mapping module 1030.

The receiver 905-a may receive information which may be passed on to base station eMTC SIB module 910-a, and to other components of wireless device 1000. The base station eMTC SIB module 910-a may perform the operations described with reference to FIG. 9. The transmitter 915-a may transmit signals received from other components of wireless device 1000. The BS system properties module 1005 may determine a bandwidth or duplexing configuration for communication with a UE or group of UEs as described with reference to FIGS. 2-4. The BS SIB scheduling parameter module 1010 may determine a scheduling parameter for a SIB based on the bandwidth or duplexing configuration as described with reference to FIGS. 2-4.

The SIB transmission module 1015 may transmit the SIB according to the scheduling parameter as described with reference to FIGS. 2-4. The BS PBCH scheduling module 1020 may determine that a broadcast channel is scheduled during a TTI within a narrowband region of a system bandwidth as described with reference to FIGS. 2-4. The BS SIB resource identification module 1025 may identify resources available for a SIB during the TTI based on the determination as described with reference to FIGS. 2-4.

The SIB mapping module 1030 may map the SIB to resources within the narrowband region based on identifying available resources of the TTI as described with reference to FIGS. 2-4. The SIB mapping module 1030 may also refrain from mapping the SIB to resources within the TTI. In some examples, the resources available for receiving the SIB include subcarriers that exclude the broadcast channel, and mapping the SIB includes mapping the SIB within the TTI onto subcarriers that exclude the broadcast channel. In some examples, the resources available for receiving the SIB include available portions of subcarriers within the narrowband region; the subcarriers may include the broadcast channel and the available portions include resource elements that exclude the broadcast channel, and mapping the SIB includes mapping the SIB within the TTI onto the available portions of the subcarriers. In some examples, mapping the SIB includes mapping the SIB onto a second set of resource elements of the TTI that excludes resource elements of the first set. In some examples, mapping the SIB includes mapping the SIB onto resource elements available for a CRS transmission. In some examples, mapping the SIB includes mapping the SIB onto resource elements excluding those available for a CRS transmission.

Figure 11:
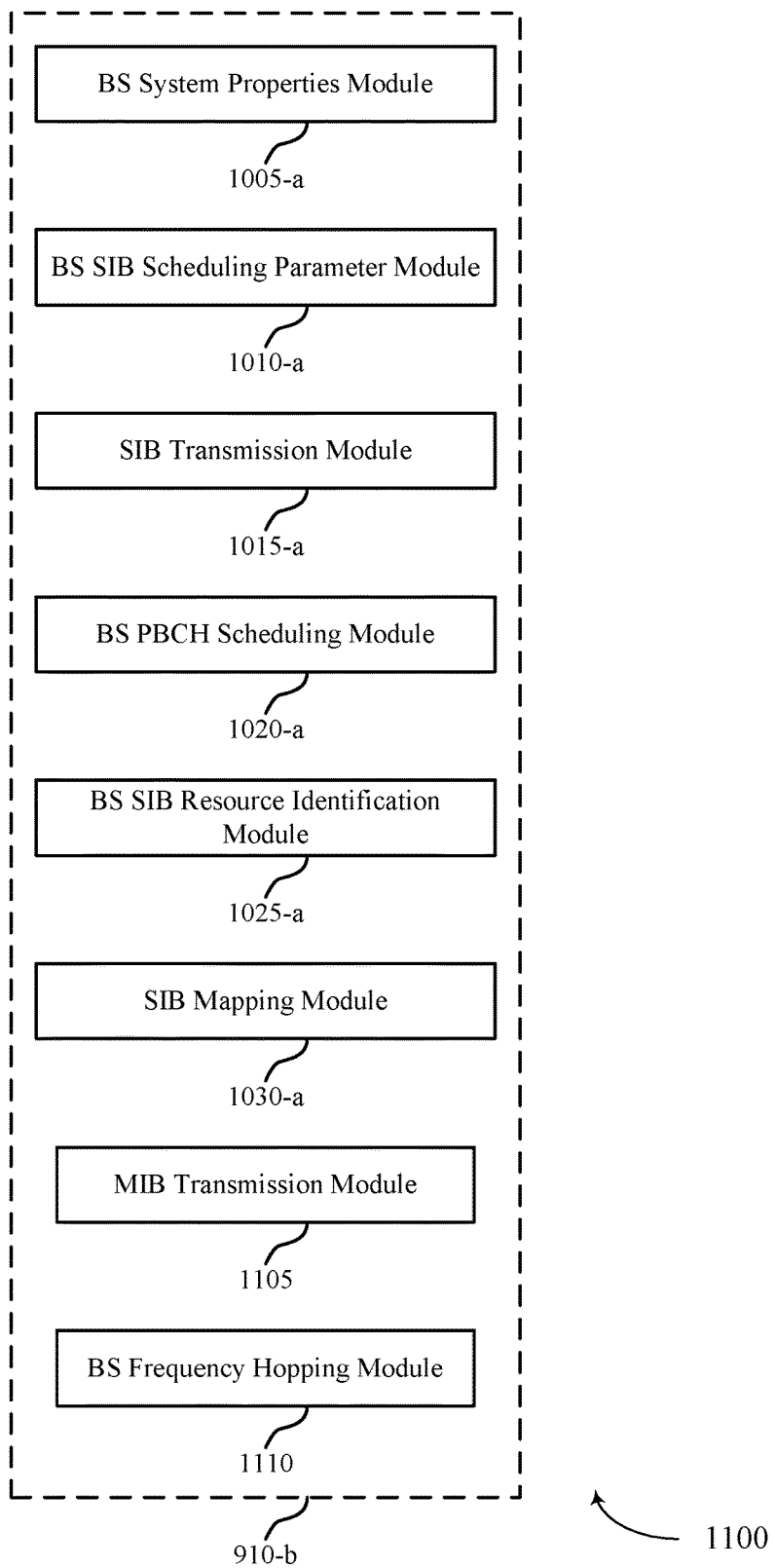

FIG. 11 shows a block diagram 1100 of a base station eMTC SIB module 910-b which may be a component of a wireless device 900 or a wireless device 1000 for system information for eMTC in accordance with various aspects of the present disclosure. The base station eMTC SIB module 910-b may be an example of aspects of a base station eMTC SIB module 910 described with reference to FIGS. 9-10. The base station eMTC SIB module 910-b may include a BS system properties module 1005-a, a BS SIB scheduling parameter module 1010-a, a SIB transmission module 1015-a, a BS PBCH scheduling module 1020-a, a BS SIB resource identification module 1025-a, and a SIB mapping module 1030-a. Each of these modules may perform the functions described with reference to FIG. 10. The base station eMTC SIB module 910-b may also include a MIB transmission module 1105, and a BS frequency hopping module 1110.

The MIB transmission module 1105 may transmit signaling indicative of the scheduling parameter for the SIB in a broadcast communication, such that the scheduling parameter for the SIB may be indicated based on the bandwidth or duplexing configuration as described with reference to FIGS. 2-4. In some examples, the broadcast communication includes a MIB or synchronization signals PSS or SSS. In some examples, the signaling includes a bit field indicative of the scheduling parameter.

The BS frequency hopping module 1110 may determine a frequency hopping configuration; the scheduling parameter may be determined based on the frequency hopping configuration as described with reference to FIGS. 2-4.

Figure 12:
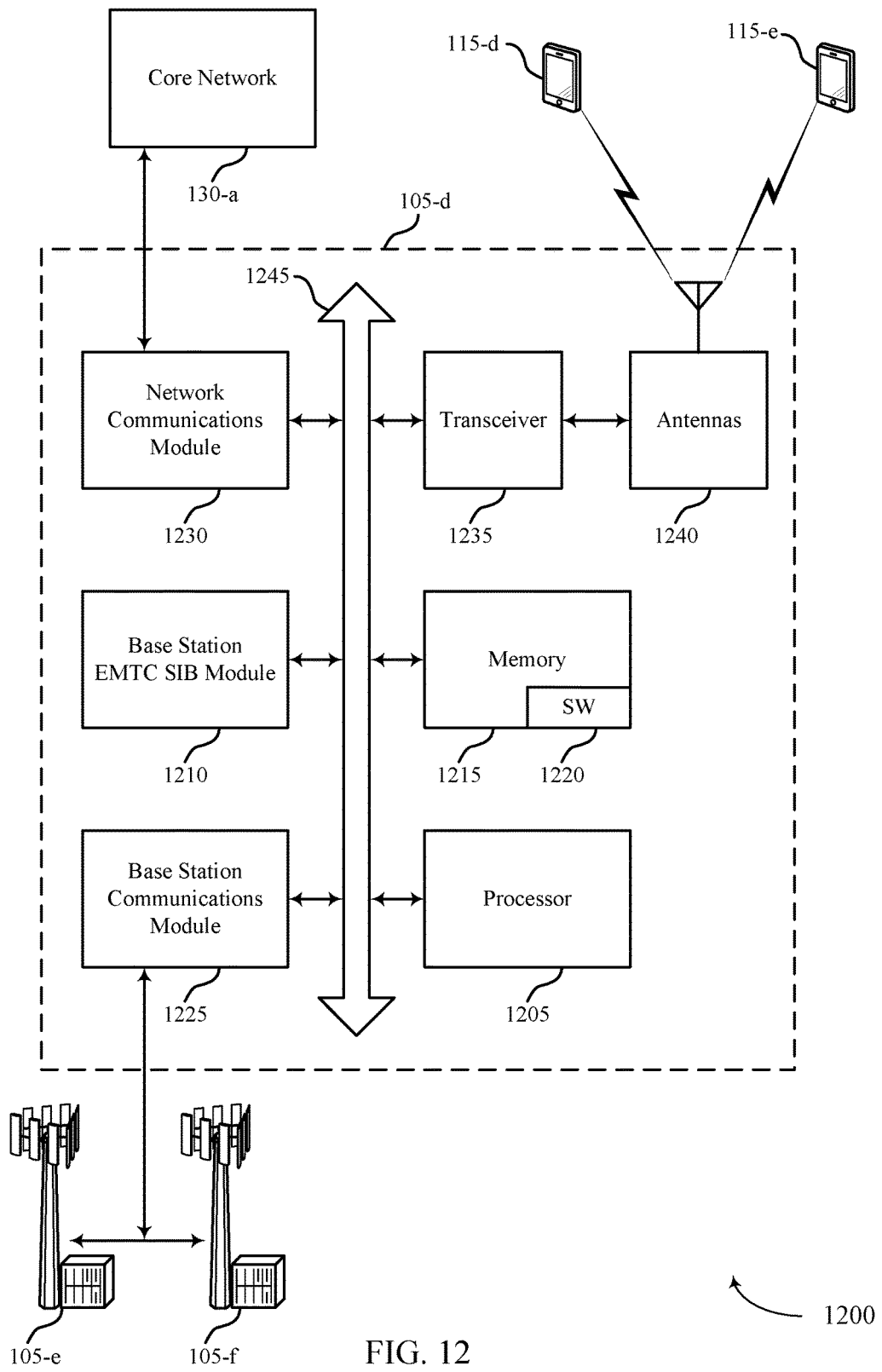
FIG. 12 illustrates a block diagram of a system, including a base station, that supports system information for eMTC in accordance with various aspects of the present disclosure.

FIG. 12 shows a diagram of a system 1200 including a base station 105 configured for system information for eMTC in accordance with various aspects of the present disclosure. System 1200 may include base station 105-d, which may be an example of a wireless device 900, a wireless device 1000, or a base station 105 described with reference to FIGS. 1, 2 and 9-11. Base Station 105-d may include a base station eMTC SIB module 1210, which may be an example of a base station eMTC SIB module 910 described with reference to FIGS. 9-11. Base Station 105-d may also include components for bi-directional voice and data communications including components for transmitting communications and components for receiving communications. For example, base station 105-d may communicate bi-directionally with UE 115-d or UE 115-e.

In some cases, base station 105-d may have one or more wired backhaul links. Base station 105-d may have a wired backhaul link (e.g., S1 interface, etc.) to the core network 130. Base station 105-d may also communicate with other base stations 105, such as base station 105-e and base station 105-f via inter-base station backhaul links (e.g., an X2 interface). Each of the base stations 105 may communicate with UEs 115 using the same or different wireless communications technologies. In some cases, base station 105-d may communicate with other base stations such as 105-e or 105-f utilizing base station communications module 1225. In some examples, base station communications module 1225 may provide an X2 interface within an LTE/LTE-A wireless communication network technology to provide communication between some of the base stations 105. In some examples, base station 105-d may communicate with other base stations through core network 130. In some cases, base station 105-d may communicate with the core network 130 through network communications module 1230.

Base station 105-d may include a processor 1205, memory 1215 (including software (SW) 1220), transceiver 1235, and antenna(s) 1240, which each may be in communication, directly or indirectly, with one another (e.g., over bus system 1245). The transceivers 1235 may be configured to communicate bi-directionally, via the antenna(s) 1240, with the UEs 115 which may be multi-mode devices. The transceiver 1235 (or other components of the base station 105-d) may also be configured to communicate bi-directionally, via the antennas 1240, with one or more other base stations (not shown). The transceiver 1235 may include a modem configured to modulate the packets and provide the modulated packets to the antennas 1240 for transmission, and to demodulate packets received from the antennas 1240. The base station 105-d may include multiple transceivers 1235, each with one or more associated antennas 1240. The transceiver may be an example of a combined receiver 905 and transmitter 915 of FIG. 9.

The memory 1215 may include RAM and ROM. The memory 1215 may also store computer-readable, computer-executable software code 1220 containing instructions that are configured to, when executed, cause the processor 1205 to perform various functions described herein (e.g., system information for eMTC, selecting coverage enhancement techniques, call processing, database management, message routing, etc.). Alternatively, the software code 1220 may not be directly executable by the processor 1205 but be configured to cause the computer, e.g., when compiled and executed, to perform functions described herein. The processor 1205 may include an intelligent hardware device, e.g., a CPU, a microcontroller, an ASIC, etc. The processor 1205 may include various special purpose processors such as encoders, queue processing modules, base band processors, radio head controllers, digital signal processor (DSPs), and the like.

The base station communications module 1225 may manage communications with other base stations 105. In some cases, a communications management module may include a controller or scheduler for controlling communications with UEs 115 in cooperation with other base stations 105. For example, the base station communications module 1225 may coordinate scheduling for transmissions to UEs 115 for various interference mitigation techniques such as beamforming or joint transmission.

The components of wireless device 500, wireless device 600, eMTC SIB module 510, system 800, wireless device 900, wireless device 1000, BS eMTC SIB module 910, and system 1200 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 13:
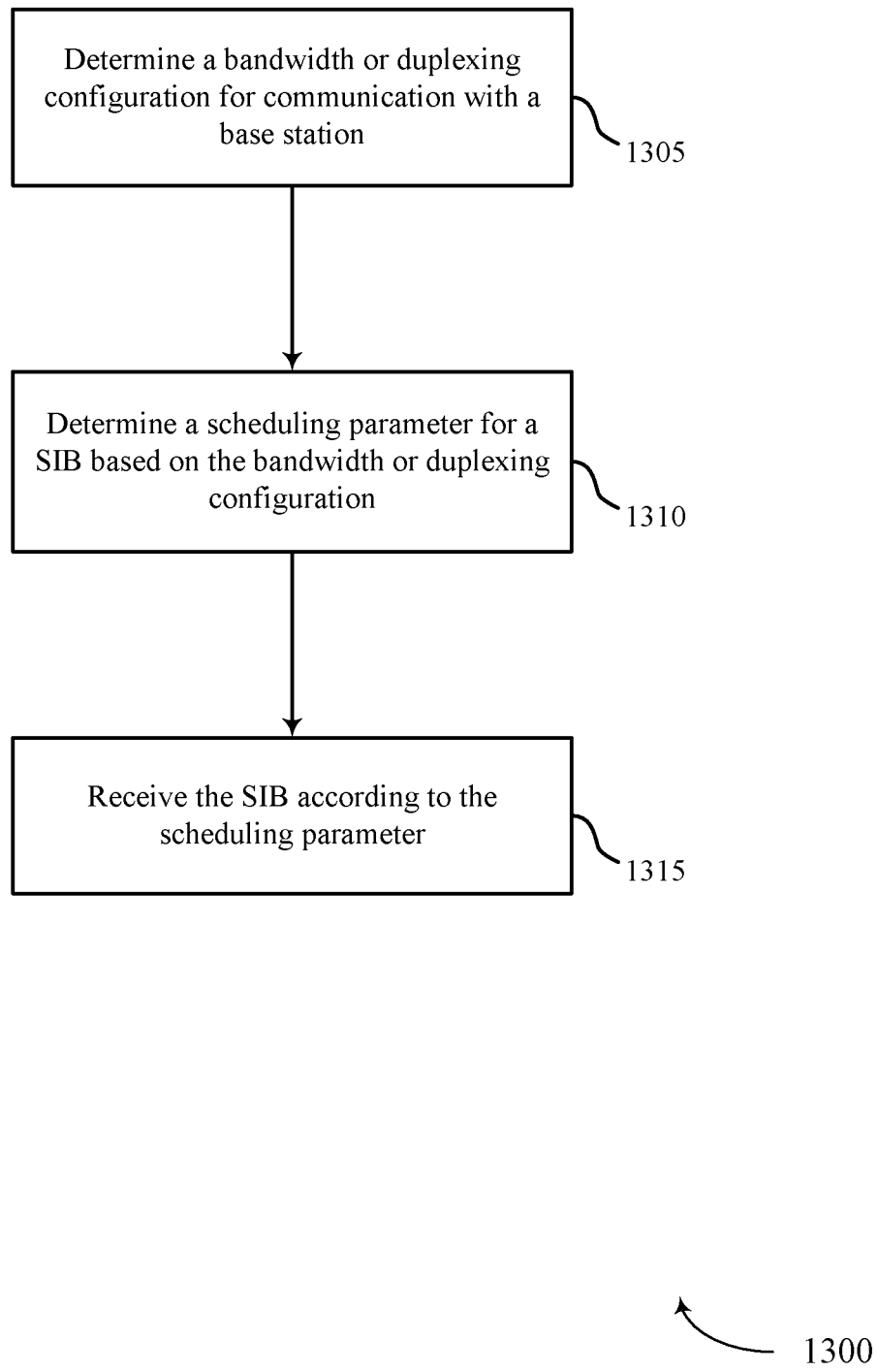
FIGS. 13-18 illustrate methods for system information for eMTC in accordance with various aspects of the present disclosure.

FIG. 13 shows a flowchart illustrating a method 1300 for system information for eMTC in accordance with various aspects of the present disclosure. The operations of method 1300 may be implemented by a UE 115 or its components as described with reference to FIGS. 1-12. For example, the operations of method 1300 may be performed by the eMTC SIB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware.

At block 1305, the UE 115 may determine a bandwidth or duplexing configuration for communication with a base station as described with reference to FIGS. 2-4. In certain examples, the operations of block 1305 may be performed by the system properties module 605 as described with reference to FIG. 6.

At block 1310, the UE 115 may determine a scheduling parameter for a SIB based on the bandwidth or duplexing configuration as described with reference to FIGS. 2-4. In certain examples, the operations of block 1310 may be performed by the SIB scheduling parameter module 610 as described with reference to FIG. 6.

At block 1315, the UE 115 may receive the SIB according to the scheduling parameter as described with reference to FIGS. 2-4. In certain examples, the operations of block 1315 may be performed by the SIB monitoring module 615 as described with reference to FIG. 6.

Figure 14:
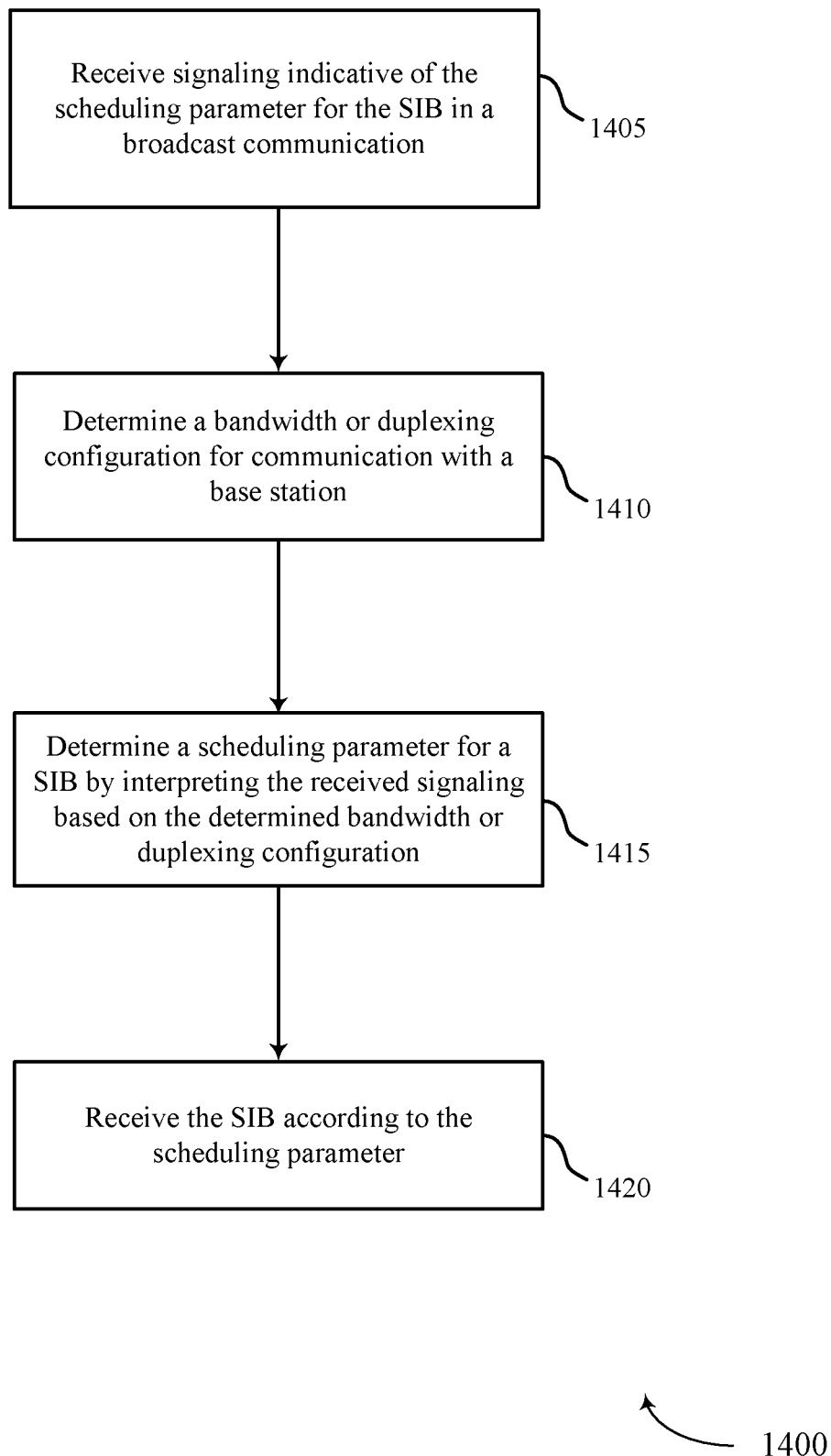

FIG. 14 shows a flowchart illustrating a method 1400 for system information for eMTC in accordance with various aspects of the present disclosure. The operations of method 1400 may be implemented by a UE 115 or its components as described with reference to FIGS. 1-12. For example, the operations of method 1400 may be performed by the eMTC SIB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1400 may also incorporate aspects of method 1300 of FIG. 13.

At block 1405, UE 115 may receive signaling indicative of the scheduling parameter for the SIB in a broadcast communication as described with reference to FIGS. 2-4. In certain examples, the operations of block 1405 may be performed by the MIB interpretation module 705 as described with reference to FIG. 7.

At block 1410, UE 115 may determine a bandwidth or duplexing configuration for communication with a base station as described with reference to FIGS. 2-4. In certain examples, the operations of block 1410 may be performed by the system properties module 605 as described with reference to FIG. 6.

At block 1415, the UE 115 may determine a scheduling parameter for a SIB by interpreting the received signaling based on the bandwidth or duplexing configuration as described with reference to FIGS. 2-4. In certain examples, the operations of block 1415 may be performed by the SIB scheduling parameter module 610 as described with reference to FIG. 6.

At block 1420, the UE 115 may receive the SIB according to the scheduling parameter as described with reference to FIGS. 2-4. In certain examples, the operations of block 1420 may be performed by the SIB monitoring module 615 as described with reference to FIG. 6.

Figure 15:
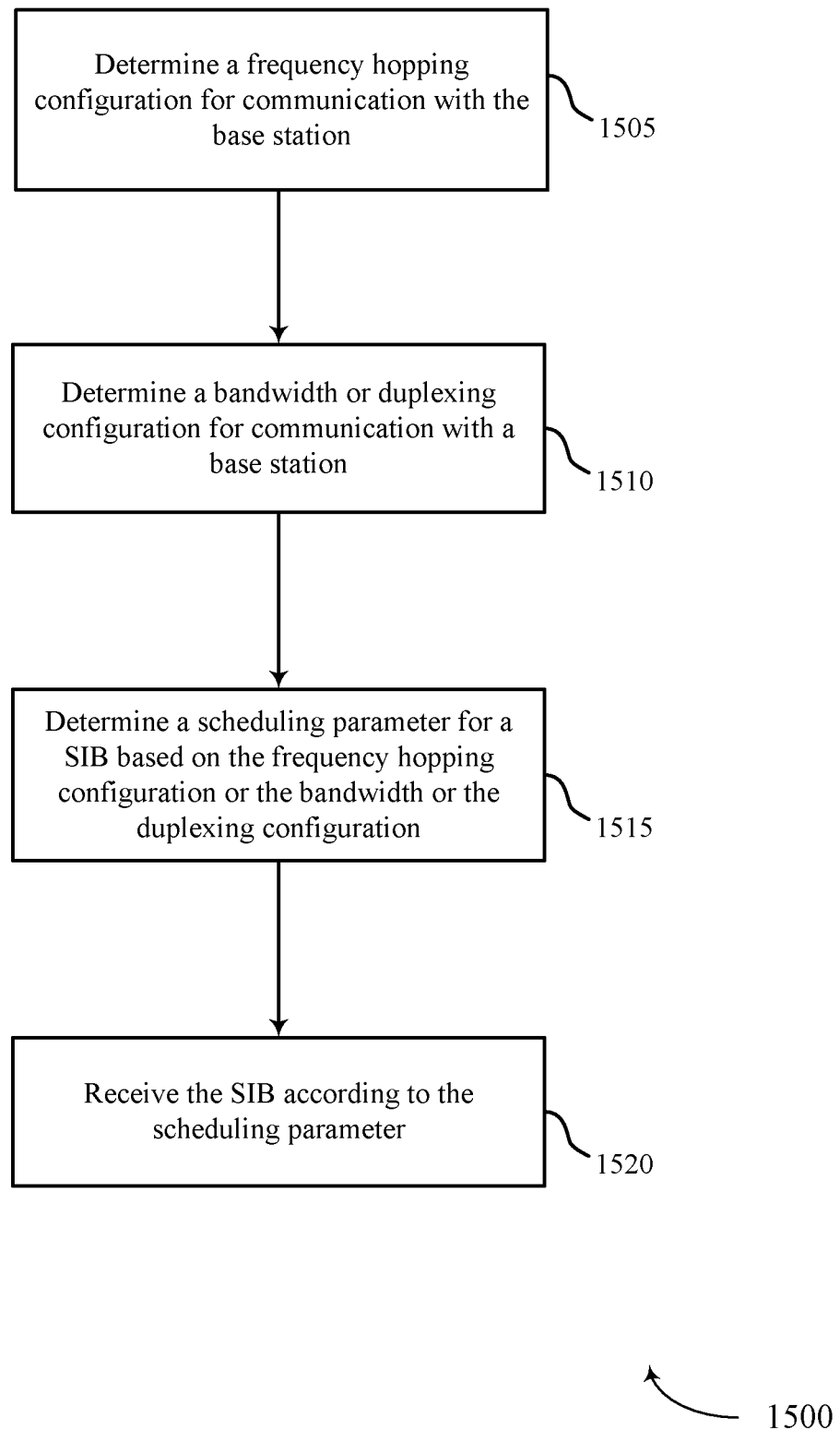

FIG. 15 shows a flowchart illustrating a method 1500 for system information for eMTC in accordance with various aspects of the present disclosure. The operations of method 1500 may be implemented by a UE 115 or its components as described with reference to FIGS. 1-12. For example, the operations of method 1500 may be performed by the eMTC SIB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1500 may also incorporate aspects of methods 1300, and 1400 of FIGS. 13-14.

At block 1505, UE 115 may determine a frequency hopping configuration for communication with the base station. In certain examples, the operations of block 1505 may be performed by the frequency hopping module 710 as described with reference to FIG. 7.

At block 1510, the UE 115 may determine a bandwidth or duplexing configuration for communication with a base station as described with reference to FIGS. 2-4. In certain examples, the operations of block 1510 may be performed by the system properties module 605 as described with reference to FIG. 6.

At block 1515, the UE 115 may determine a scheduling parameter for a SIB based on the frequency hopping configuration or bandwidth or duplexing configuration as described with reference to FIGS. 2-4. In certain examples, the operations of block 1515 may be performed by the SIB scheduling parameter module 610 as described with reference to FIG. 6.

At block 1520, the UE 115 may receive the SIB according to the scheduling parameter as described with reference to FIGS. 2-4. In certain examples, the operations of block 1520 may be performed by the SIB monitoring module 615 as described with reference to FIG. 6.

Figure 16:
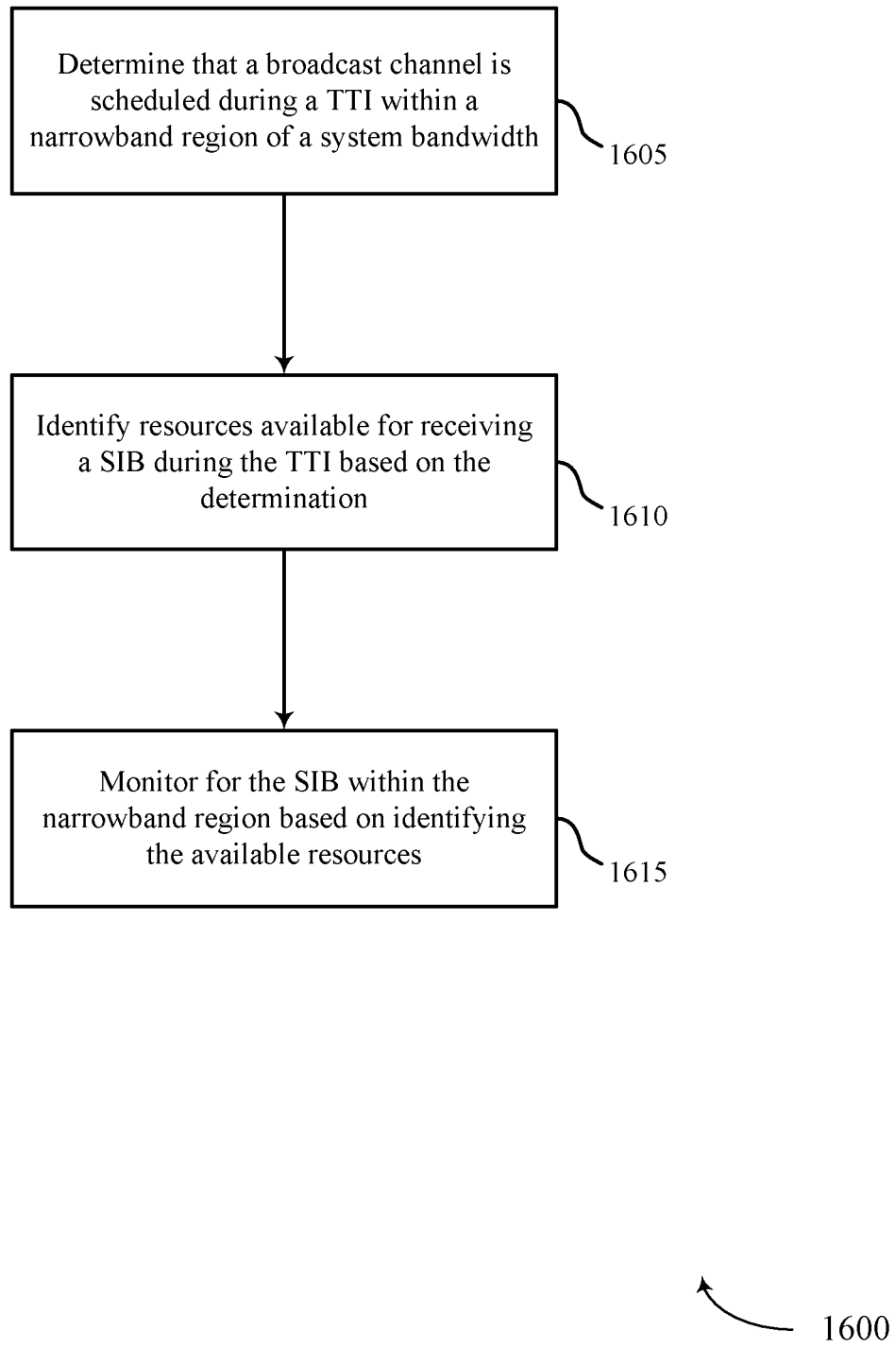

FIG. 16 shows a flowchart illustrating a method 1600 for system information for eMTC in accordance with various aspects of the present disclosure. The operations of method 1600 may be implemented by a UE 115 or its components as described with reference to FIGS. 1-12. For example, the operations of method 1600 may be performed by the eMTC SIB module 510 as described with reference to FIGS. 5-8. In some examples, a UE 115 may execute a set of codes to control the functional elements of the UE 115 to perform the functions described below. Additionally or alternatively, the UE 115 may perform aspects the functions described below using special-purpose hardware. The method 1600 may also incorporate aspects of methods 1300, 1400, and 1500 of FIGS. 13-15.

At block 1605, the UE 115 may determine that a broadcast channel is scheduled during a TTI within a narrowband region of a system bandwidth as described with reference to FIGS. 2-4. In certain examples, the operations of block 1605 may be performed by the PBCH scheduling module 715 as described with reference to FIG. 7.

At block 1610, the UE 115 may identify resources available for receiving a SIB during the TTI based on the determination as described with reference to FIGS. 2-4. In certain examples, the operations of block 1610 may be performed by the SIB resource identification module 720 as described with reference to FIG. 7.

At block 1615, the UE 115 may monitor for the SIB within the narrowband region based on identifying the available resources as described with reference to FIGS. 2-4. In certain examples, the operations of block 1615 may be performed by the SIB monitoring module 615 as described with reference to FIG. 6.

Figure 17:
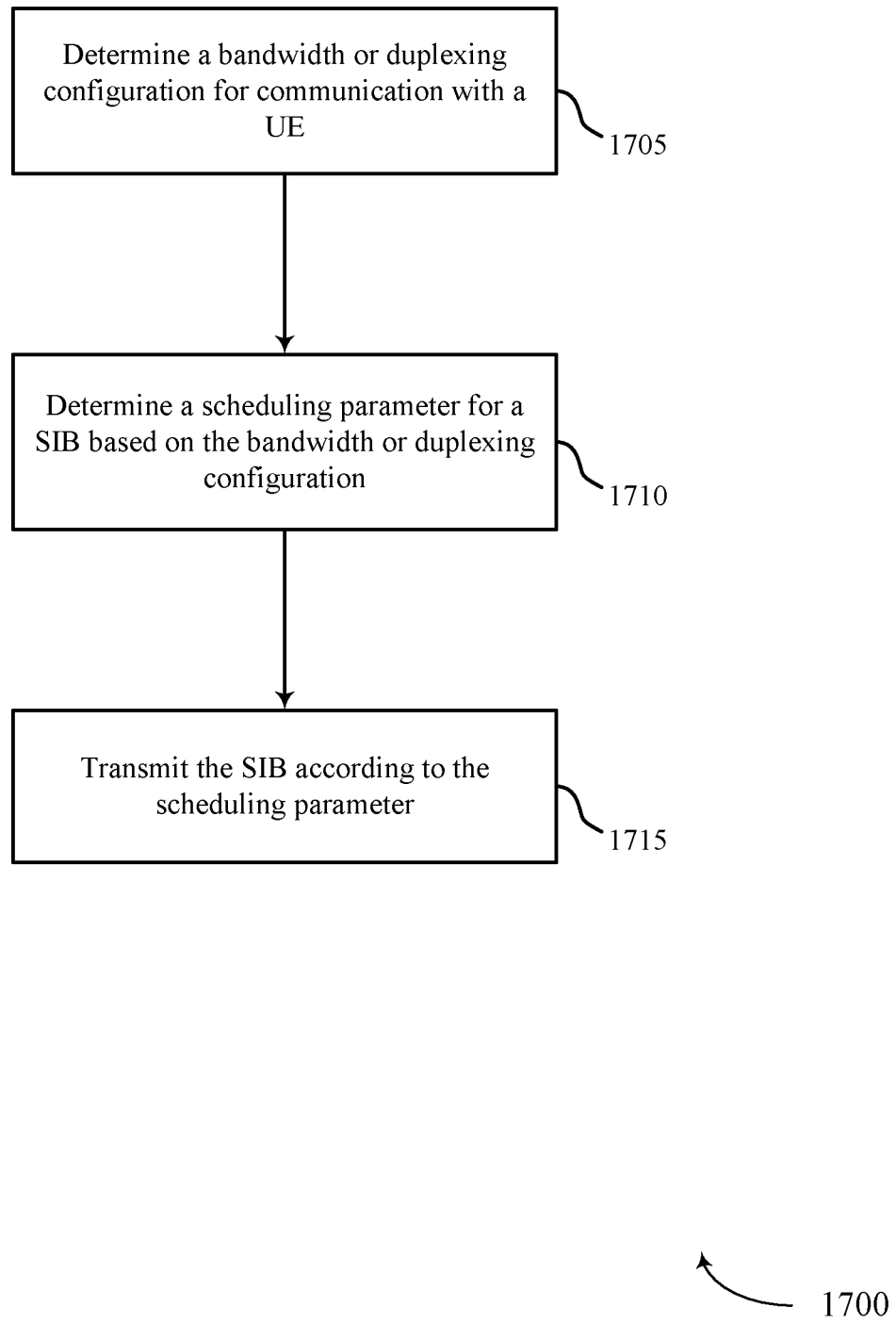

FIG. 17 shows a flowchart illustrating a method 1700 for system information for eMTC in accordance with various aspects of the present disclosure. The operations of method 1700 may be implemented by a base station 105 or its components as described with reference to FIGS. 1-12. For example, the operations of method 1700 may be performed by the base station eMTC SIB module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware.

At block 1705, the base station 105 may determine a bandwidth or duplexing configuration for communication with a UE or group of UEs as described with reference to FIGS. 2-4. In certain examples, the operations of block 1705 may be performed by the BS system properties module 1005 as described with reference to FIG. 10.

At block 1710, the base station 105 may determine a scheduling parameter for a SIB based on the bandwidth or duplexing configuration as described with reference to FIGs. 2-4. In certain examples, the operations of block 1710 may be performed by the SIB scheduling parameter module 610 as described with reference to FIG. 6.

At block 1715, the base station 105 may transmit the SIB according to the scheduling parameter as described with reference to FIGS. 2-4. In certain examples, the operations of block 1715 may be performed by the SIB transmission module 1015 as described with reference to FIG. 10.

Figure 18:
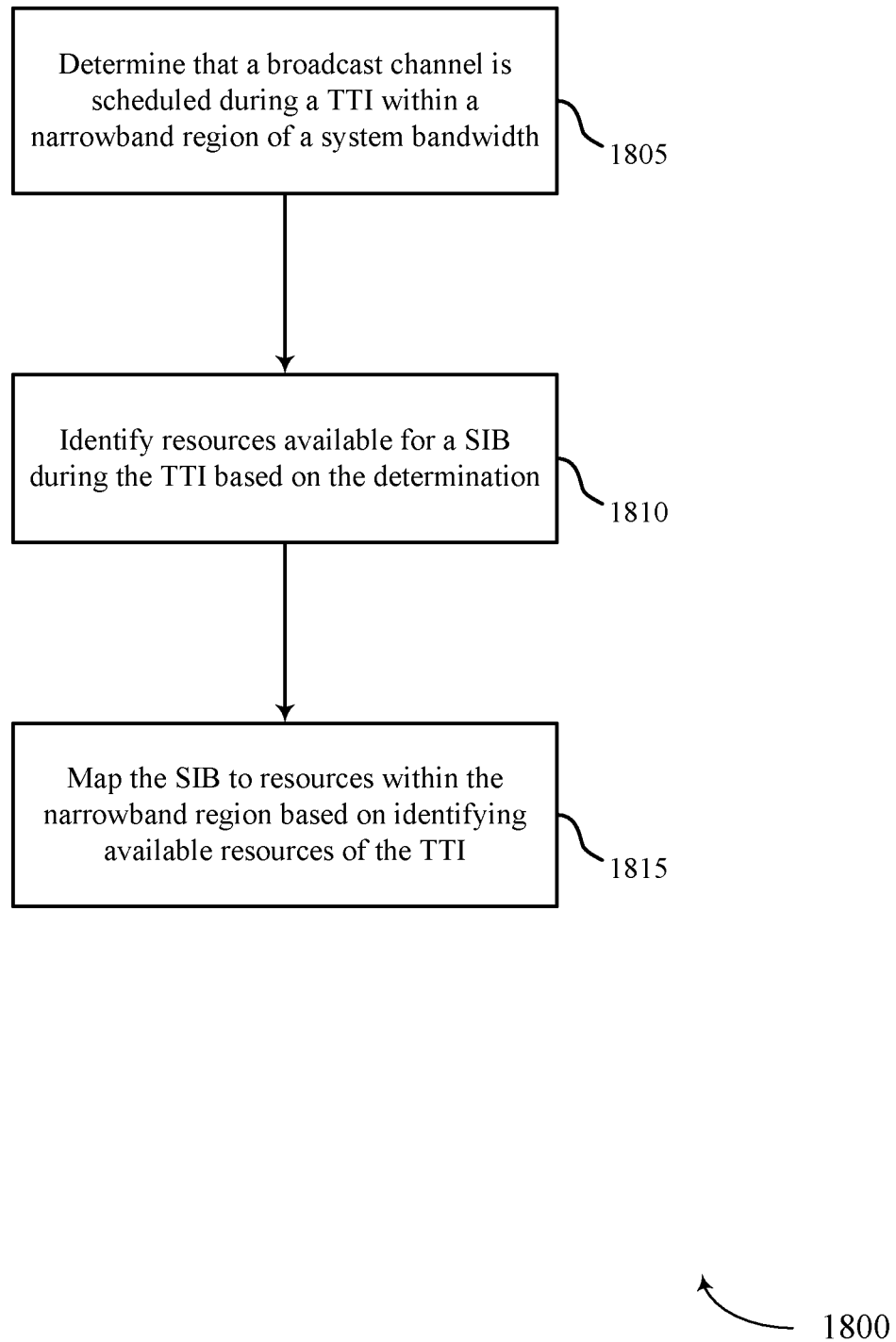

FIG. 18 shows a flowchart illustrating a method 1800 for system information for eMTC in accordance with various aspects of the present disclosure. The operations of method 1800 may be implemented by a base station 105 or its components as described with reference to FIGS. 1-12. For example, the operations of method 1800 may be performed by the base station eMTC SIB module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1800 may also incorporate aspects of method 1700 of FIG. 17.

At block 1805, the base station 105 may determine that a broadcast channel is scheduled during a TTI within a narrowband region of a system bandwidth as described with reference to FIGS. 2-4. In certain examples, the operations of block 1805 may be performed by the PBCH scheduling module 715 as described with reference to FIG. 7.

At block 1810, the base station 105 may identify resources available for a SIB during the TTI based on the determination as described with reference to FIGS. 2-4. In certain examples, the operations of block 1810 may be performed by the BS SIB resource identification module 1025 as described with reference to FIG. 10.

At block 1815, the base station 105 may map the SIB to resources within the narrowband region based on identifying available resources of the TTI as described with reference to FIGS. 2-4. In certain examples, the operations of block 1815 may be performed by the SIB mapping module 1030 as described with reference to FIG. 10.

Thus, methods 1300, 1400, 1500, 1600, 1700, and 1800 may provide for system information for eMTC. It should be noted that methods 1300, 1400, 1500, 1600, 1700, and 1800 describe possible implementation, and that the operations and the steps may be rearranged or otherwise modified such that other implementations are possible. In some examples, aspects from two or more of the methods 1300, 1400, 1500, 1600, 1700, and 1800 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication performed by a user equipment (UE), comprising:
    determining a bandwidth and duplexing configuration for communication with a base station;
    determining a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
    receiving the SIB according to the scheduling parameter.

2. The method of claim 1, further comprising:
    receiving signaling indicative of the scheduling parameter for the SIB in a broadcast communication, wherein determining the scheduling parameter comprises:
    interpreting the received signaling based at least in part on the determined bandwidth and duplexing configuration.

3. The method of claim 2, wherein the broadcast communication comprises a master information block (MIB).

4. The method of claim 2, wherein the signaling comprises a bit field indicative of the scheduling parameter for the SIB.

5. The method of claim 1, further comprising:
determining a frequency hopping configuration for communication with the base station, wherein the scheduling parameter for the SIB is determined based at least in part on the frequency hopping configuration.

6. The method of claim 1, wherein the SIB comprises a machine type communication (MTC) SIB1.

7. The method of claim 1, wherein the bandwidth and duplexing configuration is determined based at least in part on a broadcast communication.

8. The method of claim 7, wherein the broadcast communication comprises as least one of a MIB, a primary synchronization signal (PSS), or a secondary synchronization signal (SSS).

9. The method of claim 1, wherein receiving the SIB comprises:
determining that a broadcast channel is scheduled during a transmission time interval (TTI) within a narrowband region of a system bandwidth;
identifying resources available for receiving the SIB during the TTI based at least in part on the determination; and
monitoring for the SIB within the narrowband region based at least in part on identifying the available resources.

10. A method of wireless communication, comprising:
determining a bandwidth and duplexing configuration for communication with a user equipment (UE);
determining a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
transmitting the SIB according to the scheduling parameter.

11. The method of claim 10, further comprising:
transmitting signaling indicative of the scheduling parameter for the SIB in a broadcast communication, wherein the scheduling parameter for the SIB is indicated based at least in part on the bandwidth and duplexing configuration.

12. The method of claim 11, wherein the broadcast communication comprises a MIB, a primary synchronization signal (PSS), or a secondary synchronization signal (SSS).

13. The method of claim 11, wherein the signaling comprises a bit field indicative of the scheduling parameter.

14. The method of claim 10, further comprising:
determining a frequency hopping configuration, wherein the scheduling parameter is determined based at least in part on the frequency hopping configuration.

15. The method of claim 10, wherein transmitting the SIB comprises:
determining that a broadcast channel is scheduled during a transmission time interval (TTI) within a narrowband region of a system bandwidth;
identifying resources available for the SIB during the TTI based at least in part on the determination; and
mapping the SIB to resources within the narrowband region based at least in part on identifying available resources of the TTI.

16. An apparatus for wireless communication, comprising:
means for determining a bandwidth and duplexing configuration for communication with a base station;
means for determining a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
means for receiving the SIB according to the scheduling parameter.

17. The apparatus of claim 16, further comprising:
means for receiving signaling indicative of the scheduling parameter for the SIB in a broadcast communication, wherein the means for determining the scheduling parameter comprises means for interpreting the received signaling based at least in part on the determined bandwidth and duplexing configuration.

18. The apparatus of claim 17, wherein the broadcast communication comprises a master information block (MIB).

19. The apparatus of claim 17, wherein the signaling comprises a bit field indicative of the scheduling parameter for the SIB.

20. The apparatus of claim 16, further comprising:
means for determining a frequency hopping configuration for communication with the base station, wherein the means for determining the scheduling parameter for the SIB is operable to make a determination based at least in part on the frequency hopping configuration.

21. The apparatus of claim 16, wherein the SIB comprises a machine type communication (MTC) SIB1.

22. The apparatus of claim 16, wherein the means for determining the bandwidth or duplexing configuration is operable to make a determination based at least in part on a broadcast communication.

23. The apparatus of claim 22, wherein the broadcast communication comprises as least one of a MIB, a primary synchronization signal (PSS), or a secondary synchronization signal (SSS).

24. The apparatus of claim 16, further comprising:
means for determining that a broadcast channel is scheduled during a transmission time interval (TTI) within a narrowband region of a system bandwidth;
means for identifying resources available for receiving the SIB during the TTI based at least in part on the determination; and
means for monitoring for the SIB within the narrowband region based at least in part on identifying the available resources.

25. An apparatus for wireless communication, comprising:
means for determining a bandwidth and duplexing configuration for communication with a user equipment (UE);
means for determining a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
means for transmitting the SIB according to the scheduling parameter.

26. The apparatus of claim 25, further comprising:
means for transmitting signaling indicative of the scheduling parameter for the SIB in a broadcast communication, wherein the scheduling parameter for the SIB is indicated based at least in part on the bandwidth and duplexing configuration.

27. The apparatus of claim 26, wherein the broadcast communication comprises a MIB a primary synchronization signal (PSS), or a secondary synchronization signal (SSS).

28. The apparatus of claim 26, wherein the signaling comprises a bit field indicative of the scheduling parameter.

29. The apparatus of claim 25, further comprising:
means for determining a frequency hopping configuration, wherein the means for determining the scheduling parameter is operable to make a determination based at least in part on the frequency hopping configuration.

30. The apparatus of claim 25, further comprising:
means for determining that a broadcast channel is scheduled during a transmission time interval (TTI) within a narrowband region of a system bandwidth;
means for identifying resources available for the SIB during the TTI based at least in part on the determination; and
means for mapping the SIB to resources within the narrowband region based at least in part on identifying available resources of the TTI.

31. An apparatus for wireless communication, comprising:
a processor;
memory in electronic communication with the processor; and
instructions stored in the memory and operable, when executed by the processor, to cause the apparatus to:
determine a bandwidth and duplexing configuration for communication with a base station;
determine a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
receive the SIB according to the scheduling parameter.

32. The apparatus of claim 31, wherein the instructions are operable to cause the apparatus to:
receive signaling indicative of the scheduling parameter for the SIB in a broadcast communication; and
interpret the received signaling based at least in part on the determined bandwidth and duplexing configuration to determine the scheduling parameter.

33. The apparatus of claim 32, wherein the broadcast communication comprises a master information block (MIB).

34. The apparatus of claim 32, wherein the signaling comprises a bit field indicative of the scheduling parameter for the SIB.

35. The apparatus of claim 31, wherein the instructions are operable to cause the apparatus to:
determine a frequency hopping configuration for communication with the base station; and
determine the scheduling parameter for the SIB based at least in part on the frequency hopping configuration.

36. The apparatus of claim 31, wherein the scheduling parameter for the SIB comprises at least one of a repetition level, a transport block size, a subframe index, or a number of assigned resource blocks.

37. The apparatus of claim 31, wherein the SIB comprises a machine type communication (MTC) SIB1.

38. The apparatus of claim 31, wherein the instructions are operable to cause the apparatus to:
determine the bandwidth and duplexing configuration based at least in part on a broadcast communication.

39. The apparatus of claim 38, wherein the broadcast communication comprises as least one of a MIB, a primary synchronization signal (PSS), or a secondary synchronization signal (SSS).

40. The apparatus of claim 31, wherein the instructions are operable to cause the apparatus to:
determine that a broadcast channel is scheduled during a transmission time interval (TTI) within a narrowband region of a system bandwidth;
identify resources available for receiving the SIB during the TTI based at least in part on the determination; and
monitor for the SIB within the narrowband region based at least in part on identifying the available resources.

41. An apparatus for wireless communication, comprising:
a processor;
memory in electronic communication with the processor; and
instructions stored in the memory and operable, when executed by the processor, to cause the apparatus to:
determine a bandwidth and duplexing configuration for communication with a user equipment (UE);
determine a scheduling parameter for a SIB based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
transmit the SIB according to the scheduling parameter.

42. The apparatus of claim 41, wherein the instructions are operable to cause the apparatus to:
transmit signaling indicative of the scheduling parameter for the SIB in a broadcast communication; and
indicate the scheduling parameter for the SIB based at least in part on the bandwidth and duplexing configuration.

43. The apparatus of claim 42, wherein the broadcast communication comprises a MIB, a primary synchronization signal (PSS), or a secondary synchronization signal (SSS).

44. The apparatus of claim 42, wherein the signaling comprises a bit field indicative of the scheduling parameter.

45. The apparatus of claim 41, wherein the instructions are operable to cause the apparatus to:
determine a frequency hopping configuration; and
determine the scheduling parameter based at least in part on the frequency hopping configuration.

46. The apparatus of claim 41, wherein the instructions are operable to cause the apparatus to:
determine that a broadcast channel is scheduled during a transmission time interval (TTI) within a narrowband region of a system bandwidth;
identify resources available for the SIB during the TTI based at least in part on the determination; and
map the SIB to resources within the narrowband region based at least in part on identifying available resources of the TTI.

47. A non-transitory computer-readable medium storing code for wireless communication, the code comprising instructions executable to:
  determine a bandwidth and duplexing configuration for communication with a base station;
  determine a scheduling parameter for a system information block (SIB) based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
  receive the SIB according to the scheduling parameter.

48. The non-transitory computer-readable medium of claim 47, wherein the instructions are executable to:
  receive signaling indicative of the scheduling parameter for the SIB in a broadcast communication; and
  interpret the received signaling based at least in part on the determined bandwidth and duplexing configuration to determine the scheduling parameter.

49. The non-transitory computer-readable medium of claim 48, wherein the broadcast communication comprises a master information block (MIB).

50. The non-transitory computer-readable medium of claim 48, wherein the signaling comprises a bit field indicative of the scheduling parameter for the SIB.

51. The non-transitory computer-readable medium of claim 47, wherein the instructions are executable to:
  determine a frequency hopping configuration for communication with the base station; and
  determine the scheduling parameter for the SIB based at least in part on the frequency hopping configuration.

52. The non-transitory computer-readable medium of claim 47, wherein the SIB comprises a machine type communication (MTC) SIB1.

53. The non-transitory computer-readable medium of claim 47, wherein the instructions are executable to:
  determine the bandwidth and duplexing configuration based at least in part on a broadcast communication.

54. The non-transitory computer-readable medium of claim 53, wherein the broadcast communication comprises as least one of a MIB, a primary synchronization signal (PSS), or a secondary synchronization signal (SSS).

55. The non-transitory computer-readable medium of claim 47, wherein the instructions are executable to:
  determine that a broadcast channel is scheduled during a transmission time interval (TTI) within a narrowband region of a system bandwidth;
  identify resources available for receiving the SIB during the TTI based at least in part on the determination; and
  monitor for the SIB within the narrowband region based at least in part on identifying the available resources.

56. A non-transitory computer-readable medium storing code for wireless communication, the code comprising instructions executable to:
  determine a bandwidth and duplexing configuration for communication with a user equipment (UE);
  determine a scheduling parameter for a SIB based at least in part on the bandwidth and duplexing configuration, wherein the scheduling parameter for the SIB comprises at least one of a repetition level or a subframe index, and wherein the duplexing configuration comprises at least one of a frequency division duplex (FDD) configuration or a time division duplex (TDD) configuration; and
  transmit the SIB according to the scheduling parameter.

57. The non-transitory computer-readable medium of claim 56, wherein the instructions are executable to:
  transmit signaling indicative of the scheduling parameter for the SIB in a broadcast communication;
  indicate the scheduling parameter for the SIB based at least in part on the bandwidth and duplexing configuration.

58. The non-transitory computer-readable medium of claim 57, wherein the broadcast communication comprises a MIB, a primary synchronization signal (PSS), or a secondary synchronization signal (SSS).

59. The non-transitory computer-readable medium of claim 57, wherein the signaling comprises a bit field indicative of the scheduling parameter.

60. The non-transitory computer-readable medium of claim 56, wherein the instructions are executable to:
  determine a frequency hopping configuration; and
  determine the scheduling parameter based at least in part on the frequency hopping configuration.

61. The non-transitory computer-readable medium of claim 56, wherein the instructions are executable to:
  determine that a broadcast channel is scheduled during a transmission time interval (TTI) within a narrowband region of a system bandwidth;
  identify resources available for the SIB during the TTI based at least in part on the determination; and
  map the SIB to resources within the narrowband region based at least in part on identifying available resources of the TTI.

* * * * *